US007305389B2

(12) United States Patent
Zeng et al.

(10) Patent No.: US 7,305,389 B2
(45) Date of Patent: Dec. 4, 2007

(54) CONTENT PROPAGATION FOR ENHANCED DOCUMENT RETRIEVAL

(75) Inventors: Hua-Jun Zeng, Beijing (CN); Benyu Zhang, Beijing (CN); Zheng Chen, Beijing (CN); Wei-Ying Ma, Beijing (CN); Hsiao-Wuen Hon, Bellevue, WA (US); Daniel B. Cook, Seattle, WA (US); Gabor Hirschler, Issaquah, WA (US); Karen Fries, Seattle, WA (US); Kurt Samuelson, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 447 days.

(21) Appl. No.: 10/826,161

(22) Filed: Apr. 15, 2004

(65) Prior Publication Data

US 2005/0234952 A1    Oct. 20, 2005

(51) Int. Cl.
*G06F 17/30*    (2006.01)
(52) U.S. Cl. ............................ 707/5; 707/101; 715/514
(58) Field of Classification Search .............. 707/1–10, 707/100–104.1, 200–206; 715/500, 514–516, 715/811–819, 854; 709/217, 219
See application file for complete search history.

(56) References Cited

U.S. PATENT DOCUMENTS

| 5,297,042 A | 3/1994 | Morita |
| 5,418,948 A | 5/1995 | Turtle |
| 5,442,778 A | 8/1995 | Pedersen et al. |
| 5,488,725 A | 1/1996 | Turtle et al. |
| 5,694,592 A | 12/1997 | Driscoll |
| 5,812,134 A | 9/1998 | Pooser et al. |
| 5,819,258 A | 10/1998 | Vaithyanathan et al. |
| 5,845,278 A * | 12/1998 | Kirsch et al. .................. 707/3 |
| 5,987,460 A | 11/1999 | Niwa et al. |
| 6,003,027 A | 12/1999 | Prager |
| 6,006,225 A | 12/1999 | Bowman et al. |

(Continued)

FOREIGN PATENT DOCUMENTS

DE    10029644    1/2002

(Continued)

OTHER PUBLICATIONS

Sharon McDonald et al., Evaluating a Content Based Image Retrieval System, 2001, ACM, 232-240.*

(Continued)

*Primary Examiner*—Jeam Bolte Fleurantin
(74) *Attorney, Agent, or Firm*—Lee & Hayes, PLLC

(57) ABSTRACT

Systems and methods providing computer-implemented content propagation for enhanced document retrieval are described. In one aspect, reference information directed to one or more documents is identified. The reference information is identified from one or more sources of data that are independent of a data source that includes the one or more documents. Metadata that is proximally located to the reference information is extracted from the one or more sources of data. Relevance between respective features of the metadata to content of associated ones of the one or more documents is calculated. For each document of the one or more documents, associated portions of the metadata is indexed with the relevance of features from the respective portions into original content of the document. The indexing generates one or more enhanced documents.

45 Claims, 10 Drawing Sheets

U.S. PATENT DOCUMENTS

| | | | |
|---|---|---|---|
| 6,112,202 | A | 8/2000 | Kleinberg |
| 6,167,398 | A | 12/2000 | Wyard et al. |
| 6,169,986 | B1 | 1/2001 | Bowman et al. |
| 6,188,776 | B1 | 2/2001 | Covell et al. |
| 6,226,408 | B1 | 5/2001 | Sirosh |
| 6,298,351 | B1 | 10/2001 | Castelli et al. |
| 6,400,828 | B2 | 6/2002 | Covell et al. |
| 6,470,307 | B1 | 10/2002 | Turney |
| 6,556,983 | B1 | 4/2003 | Altschuler et al. |
| 6,560,600 | B1 | 5/2003 | Broder |
| 6,615,209 | B1 | 9/2003 | Gomes et al. |
| 6,628,821 | B1 | 9/2003 | Covell et al. |
| 6,711,585 | B1 | 3/2004 | Copperman et al. |
| 6,742,003 | B2 | 5/2004 | Heckerman et al. |
| 6,760,714 | B1 | 7/2004 | Caid et al. |
| 6,772,120 | B1 | 8/2004 | Moreno et al. |
| 6,892,193 | B2 | 5/2005 | Bolle et al. |
| 6,944,602 | B2 | 9/2005 | Cristianini |
| 7,136,876 | B1 | 11/2006 | Adar et al. |
| 2002/0015366 | A1 | 2/2002 | Sawano |
| 2002/0178153 | A1 | 11/2002 | Nishioka et al. |
| 2003/0046389 | A1 | 3/2003 | Thieme |
| 2003/0065632 | A1 | 4/2003 | Hubey |
| 2003/0110181 | A1 | 6/2003 | Schuetze, et al. |
| 2003/0200198 | A1 | 10/2003 | Chandrasekar et al. |
| 2003/0208482 | A1 | 11/2003 | Kim et al. |
| 2003/0226100 | A1 | 12/2003 | Farahat et al. |
| 2003/0233370 | A1 | 12/2003 | Barabas et al. |
| 2004/0010331 | A1 | 1/2004 | Terada et al. |
| 2004/0117189 | A1 | 6/2004 | Bennett |
| 2004/0249808 | A1 | 12/2004 | Azzam et al. |
| 2005/0015366 | A1 | 1/2005 | Carrasco et al. |
| 2005/0097188 | A1 | 5/2005 | Fish |
| 2005/0216443 | A1* | 9/2005 | Morton ........................ 707/3 |

FOREIGN PATENT DOCUMENTS

| | | |
|---|---|---|
| EP | 0809197 | 11/1997 |
| EP | 1320042 | 6/2003 |
| WO | WO9749048 | 12/1997 |
| WO | WO9948028 | 9/1999 |

OTHER PUBLICATIONS

Milind Mahajan et al., Improved Topic-Dependent Language Modeling Using Information Retrieval Techniques, 1999, IEEE, 541-544.*

A. Myka et al., On Automatic Similarity Linking in Digital Libraries, 1997, IEEE, 278-283.*

Qilin Li et al., Research and Design of an Efficient Collaborative Filtering Predication Algorithm, 2003, IEEE., 171-174.*

Chakrabarti S."Data Mining for Hypertext: A tutorial survey" SIGKDD Explorations vol. 1 Issue 2, Jan. 2000, 11 pages.

Cohn et al.; "The Missing Link—A Probabilistic Model of Document Content and Hypertext Connectivity" Proceedings of Neural Information Processing Systems, 2001, 7 pages.

Dhillon et al.; "Efficient Clustering of Very Large Document Collections" Data Mining,for Scientific and Engineering Applications, Chapter 1, Kluwer Academic Publishers, 2001, pp. 1-25.

Liu et al.; "Clustering Through Decision Tree Construction" 9th International Conference on Information and Knowledge Management, 2000, 10 pages.

Kleinberg J. M.; "Authoritative Sources in a Hyperlinked Environment" Proceedings of the ACM-SIAM Symposium on Discrete Algorithms, 1998, 34 pages.

Heer et al.; "Identification of Web User Traffic Composistion using Multi-Modal Clustering and Information Scent" 1st SIAM ICDM Workshop on Web Mining. Chicago 2001. 13 pages.

Gibson et al.; "Inferring Web Communities from Link Topology" Proceedings of the 9th ACM Conference on Hypertext and Hypermedia,1998, 17 pages.

Neville et al; "Iterative Classification in Relational Data" Proceedings AAAI-2000 Workshop on Learning Statistical Models form Relational Data, AAAI Press 2000, pp. 42-49.

Steinbach et al.; "A Comparison of Document Clustering Techniques" 6th ACM SIGKDD World Text Mining Conference Boston, 2000, 2 pages.

Su et al.; "Correlation-based Document Clustering using Web Logs" Proceedings of the 34th Hawaii International Conference on System Sciences, 2001, 7 pages.

Taskar et al.; "Probabilistic Classification and Clustering in Relational Data" Proceedings of the 34th Hawaii International Conference on System Sciences. 2001. 7 pages.

Unger et al.; "Clustering Methods for Collaborative Filtering" In Workshop on Recommendation System at the 15th National Conference on Artificial Intelligence, 1998, 16 pages.

Wen et al.; "Query Clustering Using User Logs" ACM Transactions on Information Systems vol. 20 No. 1; Jan. 2002, pp. 59-81.

Zeng et al; "A Unified Framework for Clustering Heterogeneous Web Objects" Proceedings of the 3rd International Conference of Web Information System Engineering, Singapore 2002, 10 pages.

"Open Directory Project" http://dmoz.org/ Netscape 1998-2004 1 page.

Berkhin, P.; "Survey of Clustering Data Mining Techniques" Accrue Software Inc.; 2002 pp. 1-56.

Chen et al.; "Building a Web Thesaurus from Web Link Structure" SIGIR 2003, Toronto Canada; 8 pages.

Zeng et al.; "CBC: Clustering Based Text Classification Requiring Minimal Labeled Data" Nov. 2003, Melbourne Florida, p. 443.

Yang et al.; "A Comparative Study on Feature Selection in Text Categorization" Proceedings of the Fourteenth International Conference on Machine Learning, Morgan Kaufmann Publishers Inc., San Francisco 1997, pp. 412-420.

Slattery et al; "Combining Statistical and Relational Methods for Learning in Hypertext Domains" Proceedings of the 8th International Conference on Inductive Logic Programming (ILP-98), 1998, pp. 38-52.

Attardi, G. et al.: "Automatic web Page Categorization by Link and context Analysis" Proceedings of THIA, European Symposium on Intelligence, 1999. *the whole document.

Brin S et al: "The anatomy of a large-scale hypertextual web search engine" Computer Networks and ISDN Systems, North Holland Publishing. Amsterdam, NL, vol. 30, No. 1-7, Apr. 1998, pp. 107-117.

Harmandas, V. et al. "Image Retrieval by Hypertext Links" Association For Computing Machinery. Proceedings of the 20th Annual INternational ACM-SIFIR Conference on Research and Development in INformation Retrieval. Philadelphia, PA, Jul. 27-31, 1997, pp. 296-303.

Smith, J.R. et al.: "An Image and Video Search Engine for the World-Wide Web" Storage and retrieval for image and video databases 5. San Jose, Feb. 13-14, 1997, Proceedings of SPIE, Bellingham, SPIE, US, vol. 3022, pp. 84-95.

Westerveld, T. et al: "Retriving Web Pages using Content, Links, URLs and Anchors" Test Retrieval Conference. Proceedings, XX, XX, Nov. 13, 2001,pp. 663-672.

EPO Communication with Search Report dated Apr. 3, 2006, from counterpart EP patent application, European Patent Application No. 05102838.9, copy attached, 8 pages.

Boyan et al., "A Machine Learning Architecture for Optimizing Web Search Engines", AAAI Workshop on Internet-Based Information Systems, 1996, pp. 1-8, Retrieved from the Internet http://www.cs.cornell.edu/People/tj/publications/boyan_etal_96a.pdf.

Frei et al., "The Use of Semantic Links in Hypertext Information Retrieval" Information Processing & Management, Elsevier, Barking, GB, vol. 31, No. 1, Jan. 2, 1995, pp. 1-13.

Li, "Toward a Qualitive Search Engine"*Internet Computing, IEEE, vol. 2, No. 4, Jul. 1998, pp. 24-29, Retrieved from the Internet at http://ieeexplore.ieee.org/xpl/abs*_free.jsp?art Number=707687.

Marchioro, Massimo, "The Quest for Correct Information on the Web: Hyper Search Engines" Computer Networks and ISDN Systems, North Holland Publishing. Amsterdam, NL, vol. 29, No. 8-13, Sep. 1997, pp. 1225-1235.

Huaizhong et al., Similarity Model and Term Association For Document Categorization, Sep. 2-6, 2002, pp. 256-260.

Kim et al., "A Comparison of Collocation-Based Similarity Measures in Query Expansion", Inform ation Processing and Management, Elsevier, Garking, GB, vol. 35, No. 1, Jan. 1999, pp. 19-30.

Shaw, Term-Relevance Computautions and Perfect Retrieval Performance Information Processing and Management, Elsevier, Barking, GB, vol. 31, No. 4, Jul. 1995, pp. 491-498.

Yeung et al., "Improving Performance of Similarity-Based Clustering by Feature Weight Learning," Apr. 2002, vol. 24, Issue 4, pp. 556-561.

Jespersen, et al., "Evaluating the Markov Assumption for Web Usage Mining", ACM, 2003, pp. 82-89.

Jimenez, et al., "The Influence of Semantics in IR using LSI and K-means Clustering Techniques", retrieved on May 8, 2007, at <<http://portal.acm.org/citation.cfm?id=963656&jmp=abstract &coll=ACM&dl=ACM&CFID..>>, ACm, vol. 19, 2003, pp. 278-284.

Kim et al, "A Comparison of Collocation-Based Similarity Measures in Query Expansion", Information Processing & Management, Elsevier Science Ltd, vol. 35, No. 1, Jan. 1999 pp. 19-30.

Qiu et al, "Concept Based Query Expansion", SIGIR Forum, Association for Computing Machinery, New York, Jun. 27, 1993, pp. 160-169.

Raghavan et al, "On the Reuse of Past Optimal Queries", SIGIR '95, Proceedings of the 18th Annual International ACM SIGIR Conference on Research and Development in Information in Information Retrieval, Jul. 9, 1995, pp. 344-350.

Beeferman D. & Berger A. "Agglomerative clustering of a search engine query log" Proceedings of the ACM SIGKDD. International cnference on Knowledge Discovery and Data Mining, ACM, US, 2000, pp. 407-416, XP002339640.

Srivastava et al. "Discovery and Applications of Usage Patterns from Web Data" Sigkdd Explorations, Jan. 2000 (2000-20001), pp. 12-23, XPoo2241892 *the whole document.

* cited by examiner

CONTENT PROPAGATION FOR ENHANCED DOCUMENT RETRIEVAL

RELATED APPLICATIONS

This patent application is related to the following patent applications, each of which are commonly assigned to assignee of this application, and hereby incorporated by reference:

pending U.S. patent application Ser. No. 10/826,159, titled "Reinforced Clustering of Multi-Type Data Objects for Search Term Suggestion", filed on Apr. 15, 2004; and pending U.S. patent application Ser. No. 10/427,548, titled "Object Clustering Using Inter-Layer Links", filed on May 1, 2003.

TECHNICAL FIELD

Implementations of the invention pertain to data mining.

BACKGROUND

Today's high technology corporations typically provide some aspect of product support to ensure that consumers and partners receive the maximum value for their technology investments. For instance, a variety of consumer and business support offerings, and strategic IT consulting services may be provided to help meet the requirements of customers and partners. Support offerings may include phone, on-site, Web-based support, and so on. Unfortunately, product support services can become prohibitively expensive, not only in terms of financial costs, but also the amount of time that is required to find a solution. For instance, on-site consulting services are typically expensive, so expensive that most non-corporate consumers cannot afford to hire an individual product consultant or troubleshooter.

Additionally, when services are automated, for instance via online searches of a knowledge base comprising product "how-to" (help) and troubleshooting articles, the amount of time that it may take the consumer to identify an on-point set of articles may become prohibitive. One reason for this is because knowledge base product troubleshooting articles are typically generated by professional writers, vendors, and the like, not the everyday users of the products for which support is sought. In such a scenario, if the user does not form a search query using the terms adopted by knowledge base (KB) content producer(s), the user may find it very difficult and time consuming to locate any on-point knowledge base troubleshooting information.

SUMMARY

Systems and methods providing computer-implemented content propagation for enhanced document retrieval are described. In one aspect, reference information directed to one or more documents is identified. The reference information is identified from one or more sources of data that are independent of a data source that includes the one or more documents. Metadata that is proximally located to the reference information is extracted from the one or more sources of data. Relevance between respective features of the metadata to content of associated ones of the one or more documents is calculated. For each document of the one or more documents, associated portions of the metadata is indexed with the relevance of features from the respective portions into original content of the document. The indexing generates one or more enhanced documents.

BRIEF DESCRIPTION OF THE DRAWINGS

In the figures, the left-most digit of a component reference number identifies the particular figure in which the component first appears.

DETAILED DESCRIPTION

Overview

Figure 1:
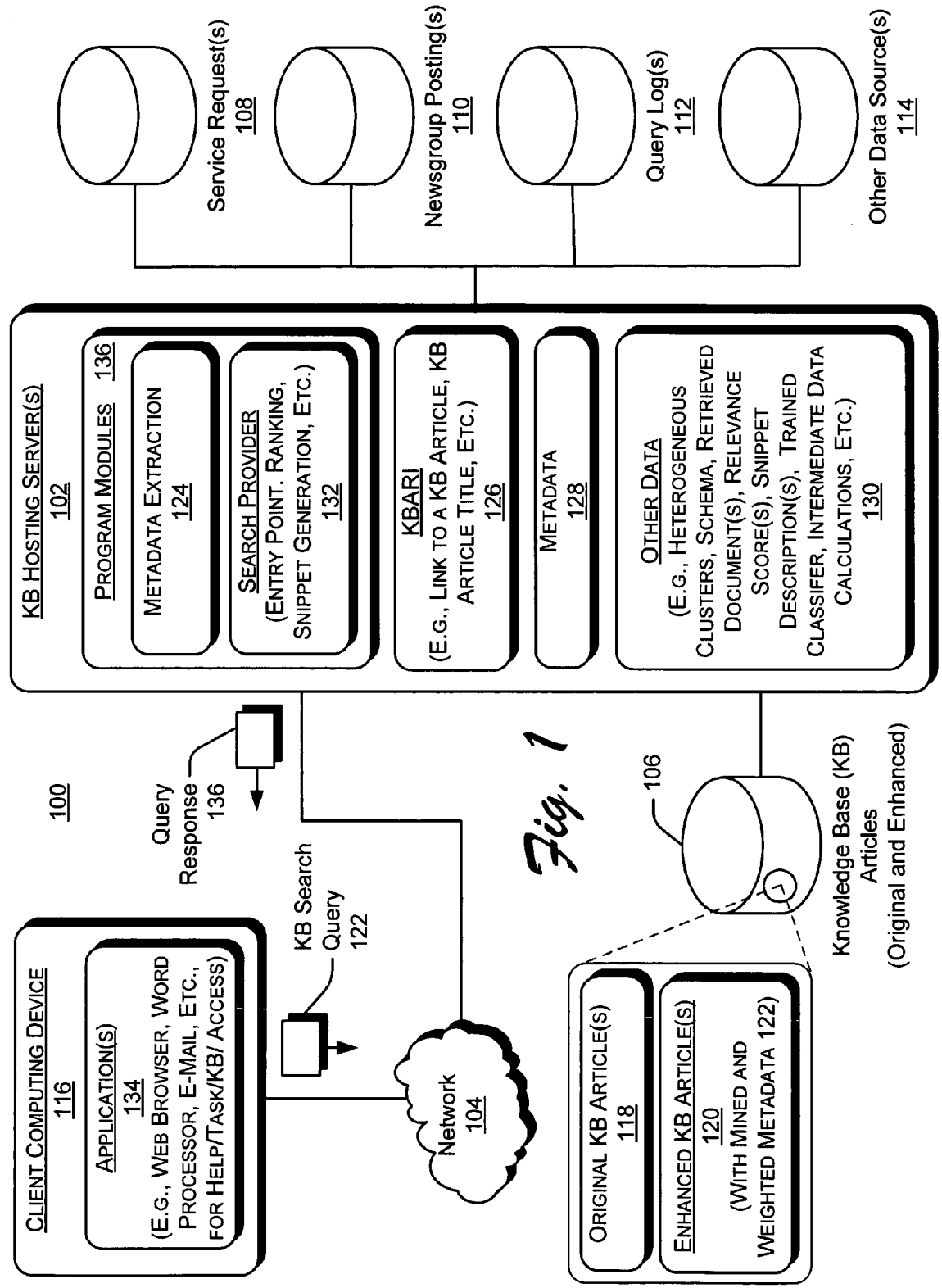
FIG. 1 illustrates an exemplary system providing content propagation for enhanced document retrieval.

KB articles are created to assist customers in locating "how-to" (help) articles, to solve product problems (troubleshoot), and/or otherwise research a product. Studies have shown that the easier it is for an end-user to search for and obtain an on-point KB article that directly addresses the customer's inquiry, the greater is the customer's satisfaction with the product and its related support infrastructure. In view of this, the following described systems and methods provide content propagation and enhanced document retrieval by analyzing information stored across a variety of data sources to locate KB article related information (KBARI). Such data sources include, for example, service request storage repositories, online product and developer support group newsgroup postings, search query click-thru logs, and/or the like.

KBARI includes, for example, substantially unique PS document (e.g., KB article) IDs, hypertext links to specific PS article(s), Universal Resource Identifier(s) (URI(s)) to specific PS article(s), document titles, etc. When KBARI is found among product service request(s) and/or postings from a product developer support newsgroup, it is probable that text in proximity to the KBARI includes information that is semantically and/or contextually valuable to the PS/troubleshooting article(s) referenced by the KBARI. Moreover, such text was likely generated by an end-user and/or product support service (PSS) engineer(s) during real problem resolution scenarios—not solely by a professional writer or vendor tasked with documenting a product.

For example, a service request (SR) in a PSS log of service request(s) is an archived document (e.g., one or more associated e-mails) that includes information initially submitted by an end-user to a PSS engineer. That is, the SR directs a product related question such as a troubleshooting scenario to the PSS engineer. The PSS engineer generally responds to the SR. Before the SR is closed, the PSS engineer generates a SR summary to clearly identify some combination of the following information: the product, the problem addressed, the problem's symptoms (e.g., action and result), causes, and/or resolution. As a result, an SR includes data that is likely to contain substantially valuable references to KB articles 106 and/or product related information generated by end-user(s) and PSS engineer(s) in real problem resolution scenarios.

With respect to newsgroup postings, entities and corporations commonly host product and/or developer related newsgroups to provide end-users with opportunities to discuss product development and troubleshooting issues online. For instance, if an end-user encounters a problem with a particular product, the user may post a corresponding article to the server that identifies the problem and requests assistance. In such a scenario, newsgroup readers, which may include votaries and/or service professionals associated with the product, may post an answer to the request. As with a service request, a newsgroup posting may include content (e.g., a link, reference, etc.) that is directly or contextually related to one or more KB articles. When a posting references a KB article, the posting provides potentially useful metadata for the KB article.

With respect to query log(s), end-users often submit search queries to search engine(s), e.g., via a Web site, seeking KB article(s) relevant to particular product(s), troubleshooting product behavior, and so on. A server, such as the one hosting the search engine and/or the KB database, records the end-user queries as well as any subsequent end-user click-thru action(s). If a query is highly-frequently associated to a KB article, then this query is most likely to be good meta-data for the KB article.

To leverage such semantically and/or contextually related information from multiple data sources, the systems and methods extract text in proximity to (e.g., surrounding) the located KBARI. The extracted text is analyzed to generate feature (keyword) importance weighting value(s) with respect to associated PS article(s). (Extracted text is associated with PS article(s) as indicated by KBARI to which the text is in proximity). The extracted text (hereinafter often referred to as "metadata") and corresponding feature importance weighting value(s) are indexed with original content of the associated PS article(s) to generate new or enhanced PS article(s). In this implementation, there is a one-to-one correspondence between original and enhanced PS articles. For instance, for each enhanced PS article there is a corresponding non-enhanced or original PS article. In another implementation, there is not such a one-to-one correspondence, and an original PS article may be replaced with an enhanced PS article.

Responsive to receiving a search query from an end-user, the systems and methods providing content propagation for enhanced document retrieval retrieve any PS article(s) (original and/or enhanced) that include term(s) of the search query. Relevance of the retrieved original and/or enhanced PS articles are then determined in view of query term proximity and popularity criteria. The search results are then ranked in view of these relevance scores. Snippet descriptions are generated from the search results to clearly indicate to the end-user the relevance of a returned document. The ranked results, along with the snippet descriptions, are communicated to the end-user.

In one implementation, the systems and methods providing content propagation for enhanced document retrieval also facilitate identification of new PS content for automatic PS article generation. These and other aspects of the systems and methods providing content propagation for enhanced document retrieval are now described in greater detail.

An Exemplary System

Turning to the drawings, wherein like reference numerals refer to like elements, the systems and methods are described and shown as being implemented in a suitable computing environment. Although not required, the systems and methods are described in the general context of computer-executable instructions, such as program modules, being executed by a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 1 shows an exemplary system 100 providing content propagation for enhanced document retrieval. In this implementation, system 100 includes KB hosting server(s) 102 coupled across network 104 to KB article(s) 106 (a database) data sources 108-114, and client computing device 116. Network 104 may include any combination of a local area network (LAN) and a general wide area network (WAN) communication environments, such as those which are commonplace in offices, enterprise-wide computer networks, intranets, and the Internet. KB hosting server 102 mines information stored across data sources 108-114, and adds this information to original KB articles 118 to generate new or enhanced KB articles 120. In this implementation, data sources 108-114 include, for example, service request(s) 108, newsgroup posting(s) 110, query log(s) 112, and/or other data source(s) 114. KB hosting server 102, responsive to receiving a KB related search query 122 from an end-user of client computing device 116, retrieves original KB article(s) 118 and/or enhanced KB article(s) 120 that include term(s) of the search query 122. Client computing device 116 is any type of computing device such as a personal computer, a laptop, a server, a mobile computing device (e.g., a cellular phone, personal digital assistant, or handheld computer), etc.

Mining PS Document Links, IDs, Etc., from Multiple Data Sources

More particularly, metadata extraction 124 of KB hosting server(s) 102 mine information stored across data sources 108-114 to identify information related to respective ones of KB articles 106. For purposes of discussion and illustration, this identified information is referred to as KB article related information (KBARI) 126. KBARI 126 includes, for example, substantially unique KB article IDs (e.g., a GUID), hypertext links to specific KB article(s), Universal Resource Identifier(s) (URI(s)) to specific KB article(s), and/or the like. When metadata extraction 124 locates KBARI 126 in service request(s) 108 from a PSS and/or newsgroup postings 110 from a product developer support newsgroup, it is very probable that text in proximity to the KBARI 126 includes information that is semantically and/or contextually valuable to the original KB article(s) 118 referenced by the KBARI 126. For instance such text may include article titles, article keywords, product problem description and resolution data, etc. Moreover, such text was likely generated by an end-user and/or PSS engineer(s) during real problem resolution scenarios—not solely by a professional writer or vendor tasked with documenting a product.

Feature Extraction and Importance Weighting

To leverage semantically and/or contextually related KB article information from data source(s) 108-114, metadata extraction 124 extracts text in proximity (e.g., surrounding) to located KBARI 126. For purposes of discussion, such extracted text is shown as metadata 128. To provide an end-user with KB article(s) 106 that are substantially most pertinent to terms of search query 122, metadata extraction 124 analyzes metadata 128 to generate feature importance (relevance) weighting value(s) with respect to associated ones of KB article(s) 106. (Extracted metadata 128 is associated with KB article(s) 106 as indicated by corresponding KBARI 126).

More particularly, metadata extraction 124 utilizes full text searching techniques to assign different relevance weights to features of metadata 128. In this implementation and with respect to service requests 108, greater weight is assigned to titles and symptoms as compared to weights assigned to other service request information, for example, a problem resolution. This is because a user will more likely formulate a search query with problem symptom(s), rather than with problem resolution information. Feature weighting may also reflect the number of times that a particular KB article reference (i.e., a respective piece of KBARI 126) is identified within its context, be a function of reference ages, etc. Such feature weighting is also applied to newsgroup posting(s) 110.

With respect to metadata 128 extracted from query log(s) 112, metadata extraction 124 performs feature analysis and weighting first by identifying some combination of the following information: (a) search queries frequently generated by end-users to search KB articles 106, (b) subsequently selected KB articles 106, and/or (c) any other KB articles 106 related to the selected articles. Metadata extraction 124 then addresses sparse click-thru data associated with (a), (b), and/or (c) by generating clusters of similar queries (query clusters) and clusters of related KB articles 106 (i.e., article clusters). Sparse click-thru data typically results if a user selects (i.e., clicks-thru) a small number (e.g., one or more) of documents returned from a search engine. For purposes of illustration, query cluster(s) and article cluster(s) are also represented as respective portion(s) of "other data" 130. An exemplary clustering technique for formulating clusters for similar queries and related KB articles is described in greater detail below in Appendix A, which is titled "Exemplary Clustering of Heterogeneous Objects."

To persist and manage the weighted features of metadata 128, metadata extraction and analysis module 124 indexes metadata 128 and corresponding feature importance weighting value(s) with original content of the associated original KB article(s) 118 to generate new or enhanced KB article(s) 120. (Recall that metadata 128 includes data mined from one or more data sources 108-114 that has been determined to be complementary to one or more respective KB article(s) 106). In this implementation, the weighted features of metadata 128 are tagged so that markup languages such as XML may be utilized to reference and retrieve content of the index. In one implementation, metadata 128 is indexed in an enhanced KB article 120 as an inverted index. In this implementation, there is a one-to-one correspondence between enhanced KB articles 120 and original KB articles 118. For instance, for each enhanced KB article 120 there is a corresponding non-enhanced or original KB article 118. This one-to-one correspondence means that at least a subset of the original KB articles 118 will have a corresponding enhanced KB article 120. In another implementation, there is not such a one-to-one correspondence. For example, an original KB article 118 may be replaced with an enhanced KB article 120.

Enhanced KB Article Retrieval

Search provider 132 receives a KB related search query 122 from an end-user of client computing device 116. Term(s) of search query 122 are pertinent to a product research or troubleshooting inquiry. In one implementation, search query 122 includes information specified in Extended Markup Language (XML). The end-user uses any of a number of different possible application(s) 134 to send search query 122 over network 104 to KB hosting server(s) 102. Application(s) 134 include, for example, a Web browser, word processor, e-mail, and/or other types of computer-program application(s).

In this implementation, search provider 132 provides a remote application entry point to KB hosting server 102 and search engine functionalities. The entry point allows communications between KB server 102 and any of the various possible architectural implementations of application(s) 134. For example, in one implementation, the entry point supports Hypertext Transfer Protocol (HTTP) commands communicated from an application 134 implemented as a Web browser. In another implementation, the entry point supports XML-based messaging protocols such as Simple Object Access Protocol (SOAP). Other entry point implementations are also possible as a function of the particular type of communication support desired between application(s) 134 and search provider 132.

Responsive to receiving search query 122, search provider 132 parses and enforces the data format of search query 122 in view of a schema, which is shown as a respective portion of "other data" 130. In one implementation, the schema is uploaded to KB hosting server 102, for instance, by client computing device 116. Next, search provider 132 performs a full-text search on KB articles 106 to identify and retrieve related/pertinent original KB article(s) 118 and/or enhanced KB article(s) 120. For purposes of illustration and discussion, such retrieved documents are shown as a respective portion of "other data" 130.

Retrieved Document Relevance and Ranking Operations

Relevance of the retrieved documents are then determined in view of query term proximity and popularity criteria. With respect to term proximity, the length of search query 122 to search for a KB article 106 may be longer than other types of queries (e.g., a query modeled for a general Web search). This is because more words/terms are generally used to describe product troubleshooting and/or research questions. In light of this, and to locate a KB article 106 that covers as many query term fragments as possible in queries that may include more terms, search provider 132 uses term proximity to weight the terms in search query 122. A proximity value is transformed by a curve into a weighting factor for similarity values output by full-text retrieval module as follows:

$$Sim = Sim_{orig} * \text{proximity},$$

$$\text{proximity} = \frac{\log(1 + \alpha(\beta * \text{Hit} + (1-\beta)*(1-EditDistance)))}{\log(1+\alpha)},$$

wherein α, β are parameters configured to control the relative weight of each part of search query 122. Hit parameter represents the percentage of terms of search query 122 in a document, over all terms of search query 122. EditDistance parameter is a measure of "misorder" between query and document. With respect to the term "misorder", consider for example, that a query includes the following keywords: "information retrieval and data mining", and the document is "retrieval information and mining from data". The keywords "information" and "retrieval", "data" and "mining" of this example are misordered. To address this, we provide a penalty to misordered keywords when calculating similarity between a query and a corresponding document. For purposes of discussion, term proximity and similarity values are shown as "relevance scores" in "other data" 130.

Search provider 132 ranks the retrieved documents in view of the query term proximity based relevance scores, and also in view of popularity of the identified document(s). In one implementation, this is accomplished by determining the age of the identified KB articles 106, and assigning greater weight to a more recent article 106 as being "more popular" than an older KB article. 106. In another implementation, wherein the popularity of a KB article 106 is substantially difficult to determine popularity of the identified KB article(s) 106 is determined as a function of the number of times the article(s) is/are referenced across service request(s) 108 and/or newsgroup posting(s) 110. The greater the number of times that an article is referenced, the greater the articles popularity and the higher it is ranked compared to an article that has not been referenced as many times. With respect to newsgroup posting(s) 110, KB article 106 popularity is a function of frequency of article reference and/or some determination of newsgroup poster prevalence in the newsgroup-the more articles posted by a particular user, the greater the user's prevalence.

A relatively new KB article 106 in view of a small frequency of reference would indicate a small relative popularity. Yet, the new article may be of significant value to the end-user. Accordingly, in one implementation, search provider 132 combines the factors of frequency of reference and age, and normalizes the popularity for KB articles with different age as follows:

$$\text{popularity} = \frac{\log(1 + \alpha(\beta * I_{ref} + (1-\beta)*(1-I_{age})))}{\log(1+\alpha)}.$$

$I_{ref}$ represents the importance from frequency of reference (the higher the reference frequency, the higher the resulting importance value). $I_{age}$ represents the importance from released time (age of the article). Parameters α and β represent the relative weighting between the importance from frequency of reference and the importance from released time, which can be specified by a prior knowledge and/or learned from training data. The newer a KB article 106, the higher the calculated article importance.

$$I_{ref} = 0.5 + 0.5 \, freq(ref)/\max \, freq(ref)$$

$$I_{age} = \frac{1}{1 + e^{age}}.$$

Results from searching the KB articles(s) 106 with term(s) of search query 122 are ranked, or considered relevant as a function of the calculated importance values, each of which are represented with respective portion(s) of "other data" 130.

Search Result Snippet Generation/Highlighting

In one implementation, and to substantially maximize query-related information presented to end-users, search provider 132 generates snippet descriptions for one or more of the top ranked retrieved documents to clearly indicate to the end-user the relevance of a retrieved document (i.e., a clear indication to the end-user of how the identified material (article(s)) is related to term(s) of search query 122. For purposes of illustration, snippet description(s) is/are represented with respective portion(s) of "other data" 130. To generate a snippet description, search provider 132 locates one or more blocks from a retrieved KB article 106 determined to be relevant to search query 122 for the snippet description, and then highlights any terms of the search query 122 in the one or more blocks. Search provider 132 identifies the one or more blocks with a sliding window of configurable size that is applied to portions of the retrieved document. In one implementation, the size of the sliding window is a function of UI space available for snippet description display on client computing device 116.

For each application of the sliding window to a portion of a retrieved KB article 106, search provider 132 measures the amount of query-related information carried by text delineated by the sliding window. This measure is represented with a respective portion of "other data" 130. The measure includes values based on quantitative criteria such as word frequency, word proximity to an enhanced query term, word position, etc. Search provider 132 utilizes a trained classifier model (see, "other data" 130) to combine these different criteria to get the most informative block for the snippet description. In this manner, a snippet description clearly illustrates to the end-user a relevance of the identified KB article 106.

The trained classifier model is trained by linear regression, which is a classic learning method in statistics. Linear regression attempts to explain the relationship of a vector x and a value y with a straight line fit to the data. The linear regression model postulates that:

$$y = b_0 + \sum_{j=1}^{p} b_j x_j + e$$

where the "residual" e is a random variable with mean zero. The coefficients $b_j$ are determined by the condition that the sum of the square residuals is as small as possible. The variables $x_j$ can come directly from inputs, or some transformations, such as log or polynomial, of inputs.

Search provider 132 encapsulates at least a subset of the top-ranked retrieved document(s) along with corresponding snippet descriptions into query response 136. Search provider 132 communicates query response 136 to client computing device 116 for presentation and use by the end-user to solve product research and/or troubleshooting inquiries.

An Exemplary Procedure

Figure 2:
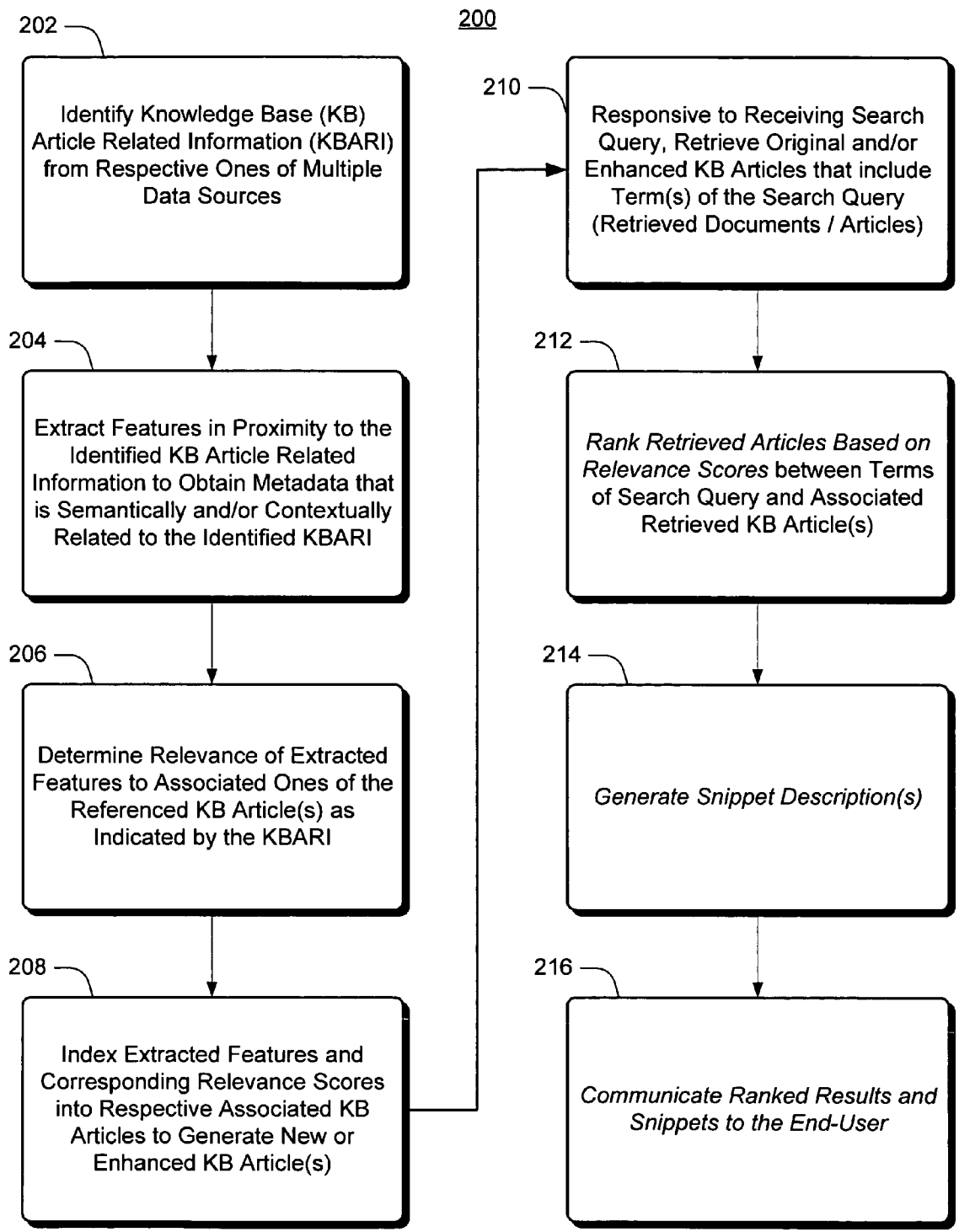
FIG. 2 illustrates an exemplary procedure providing content propagation for enhanced document retrieval.

FIG. 2 illustrates an exemplary procedure 200 for content propagation to enhance document retrieval. For purposes of discussion, operations of the procedure are discussed in relation to the components of FIG. 1. (All reference numbers begin with the number of the drawing in which the component is first introduced). At block 202, metadata extraction 124 (FIG. 1) identifies information—knowledge-based article related information (KBARI 126)—associated with specific KB articles 106 from multiple respective ones of data sources 108-114. At block 204, metadata extraction 124 extracts features in proximity to the identified information of block 202. At block 206, metadata extraction 124 analyzes the extracted features (metadata 128) to generate relevance important measures with respect to corresponding ones of associated knowledge base articles 106. At block 208, metadata extraction 124 indexes the extracted features along with corresponding relevance scores into associated individual ones of the knowledge base articles 106. This generates new or enhanced knowledge base articles 120.

At block 210, search provider 132, responsive to receiving search query 122, retrieves original KB articles 118 and/or enhanced KB articles 120 that include term(s) of search query 122. At block 212, search provider 132 ranks the retrieved documents/articles based on relevance scores of search query 122 term(s) to respective ones of the documents/articles. At block 214, search provider 132 generates snippet descriptions for the retrieved knowledge base articles 106. At block 216, search provider 132 communicates the ranked results and snippet descriptions to the end-user.

An Exemplary Operating Environment

Figure 3:
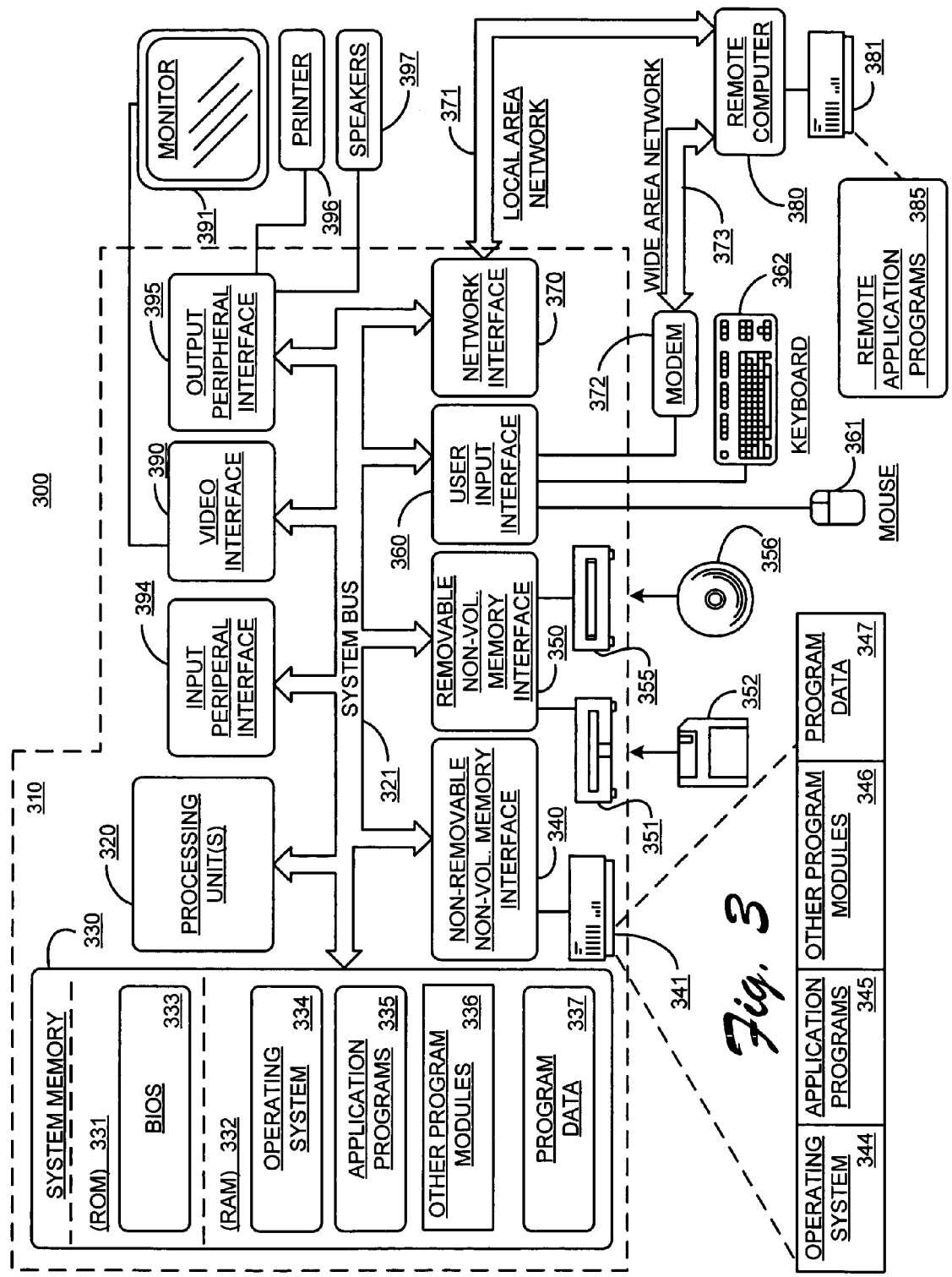
FIG. 3 shows an exemplary suitable computing environment on which the subsequently described systems, apparatuses and methods providing content propagation for enhanced document retrieval may be fully or partially implemented.

FIG. 3 illustrates an example of a suitable computing environment 300 on which the system 100 of FIG. 1 and the methodology of FIG. 2 providing data source content propagation for enhanced document retrieval may be fully or partially implemented. FIG. 3 illustrates an example of a suitable computing environment 300 on which the described systems, apparatuses and methods for data source content propagation for enhanced document retrieval may be implemented (either fully or partially). Exemplary computing environment 300 is only one example of a suitable computing environment and is not intended to suggest any limitation as to the scope of use or functionality of systems and methods the described herein. Neither should computing environment 300 be interpreted as having any dependency or requirement relating to any one or combination of components illustrated in computing environment 300.

The methods and systems described herein are operational with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 3, an exemplary system providing content propagation for enhanced document retrieval includes a general purpose computing device in the form of a computer 310. The following described aspects of computer 310 are exemplary implementations of client computing device 116 (FIG. 1) and/or KB hosting server 102 (FIG. 1). Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

System memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337. In one implementation, referring in combination to FIG. 1, computer 310 is a KB hosting server 102. In this scenario, application programs 335 comprise program modules 138 of FIG. 1, and program data 337 comprises KB article related information (KBARI) 126, metadata 128, and/or "other data" 130 of FIG. 1.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that they are at least different copies.

A user may enter commands and information into the computer 310 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB).

A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 operates in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381. The network connections shown are exemplary and other means of establishing a communications link between the computers may be used.

Conclusion

Although the systems and methods providing content propagation for enhanced document retrieval have been described in language specific to structural features and/or methodological operations or actions, it is understood that the implementations defined in the appended claims are not necessarily limited to the specific features or actions described. For example, although system 100 of FIG. 1 has been described in terms of data source content propagation for enhanced KB article 106 retrieval, the described systems and methods can be used to propagate metadata mined from one or more independent data sources to referenced documents of any type, not only to KB or product support articles. For instance, system 100 may be used to provide content propagation for enhanced document retrieval across data sources that include links, references, titles, document IDs, and so on, with respect to other types of documents. Accordingly, the specific features and actions of the written description are disclosed as exemplary forms of implementing the claimed subject matter.

Appendix A

Clustering of Heterogeneous Objects

Background for Exemplary Clustering Systems and Methods

Clustering involves grouping of multiple objects, and is used in such applications as search engines and information mining. Clustering algorithms group objects based on the similarities of the objects. For instance, Web page objects are clustered based on their content, link structure, or their user access logs. The clustering of users is based on the items they have selected. User objects are clustered based on their access history. Clustering of items associated with the users is traditionally based on the users who selected those items. A variety of clustering algorithms are known. Prior-art clustering algorithms include partitioning-based clustering, hierarchical clustering, and density-based clustering.

The content of users' accessed Web pages or access patterns are often used to build user profiles to cluster Web users. Traditional clustering techniques are then employed. In collaborative filtering, clustering is also used to group users or items for better recommendation/prediction.

Use of these prior clustering algorithms, in general, has certain limitations. Traditional clustering techniques can face the problem of data sparseness in which the number of objects, or the number of links between heterogeneous objects, are too sparse to achieve effective clustering of objects. With homogenous clustering, the data set being analyzed contains the same type of objects. For example, if the homogenous clustering is based on a Web page and a user, then the Web page objects and the user objects will each be clustered separately. If the homogenous clustering is based on an item and a user, then the item objects and the user objects will each be clustered separately. In such homogenous clustering embodiments, those objects of the same type are clustered together without consideration of other types of objects.

Figure 4:
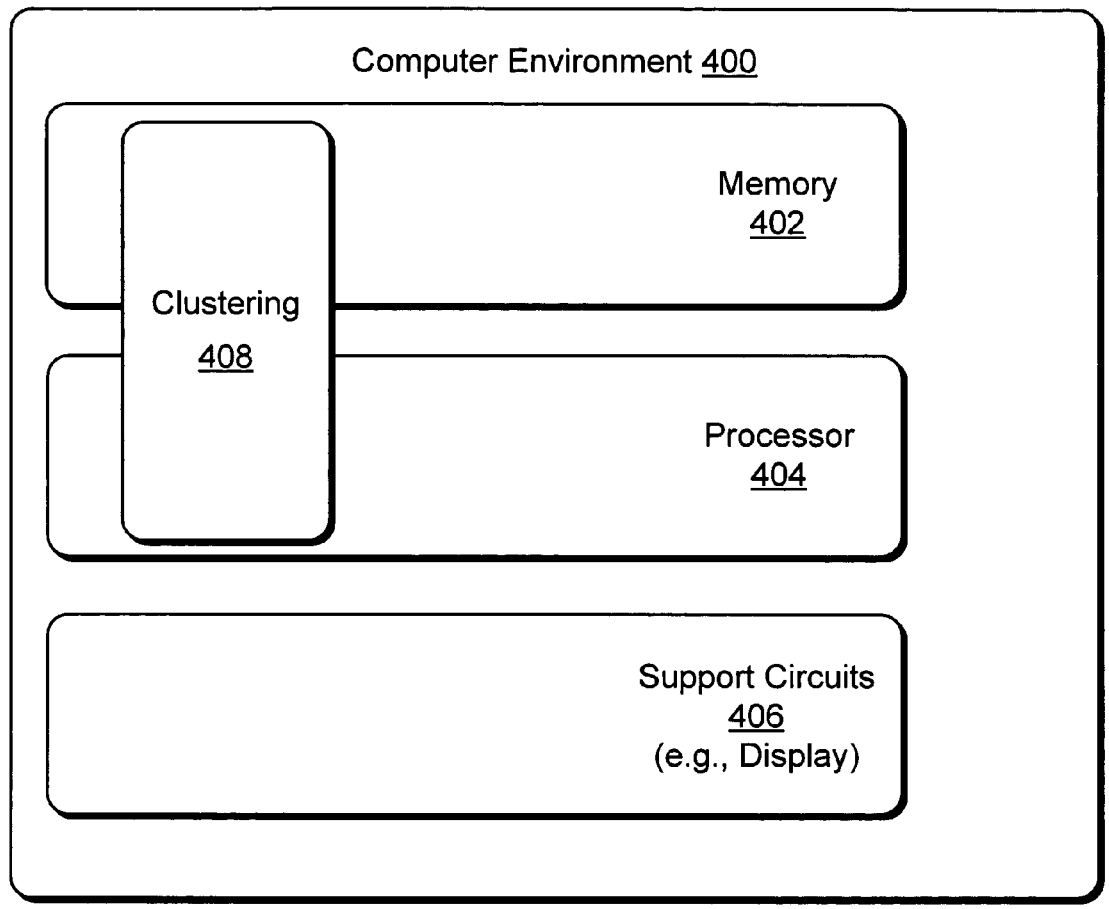
FIG. 4 is a block diagram of one embodiment of computer environment that can be used for clustering.

Prior-art heterogeneous object clustering cluster the object sets separately. The heterogeneous object clustering uses the links only as flat features representing each object node. In prior art heterogeneous clustering, the overall link structure inside and between the layers is not considered, or alternatively simply treated as separated features Exemplary Clustering Systems and Methods One embodiment of computer environment 400 (that is a general purpose computer) that can benefit by the use of clustering is shown in FIG. 4. The computer environment 400 includes a memory 402, a processor 404, a clustering portion 408, and support circuits 406. The support circuits include such devices as a display and an input/output circuit portion that allow the distinct components of the computer environment 400 to transfer information (i.e., data objects).

Clustering is performed within the clustering portion 408. The clustering portion 408 can be integrated within the memory 402 and the processor 404 portions of the computer environment. For example, the processor 404 processes the clustering algorithm (which is retrieved from memory) that clusters the different objects. The memory 402 (such as databases) is responsible for storing the clustered objects and the associated programs and clustering algorithms so that the clustered objects can be retrieved (and stored) as necessary. The computer environment 400 may be configured as a stand-alone computer, a networked computer system, a mainframe, or any of the variety of computer systems that are known. Certain embodiments disclosed herein describe a computer environment application (a computer downloading Web pages from the Internet). It is envisioned that the concepts described herein are applicable to any known type of computer environment 400.

This written description provides a clustering mechanism by which the percentage of the returned results that are considered reliable (i.e., are applicable to the user's query) is increased. Clustering can be applied to such technical areas as search tools, information mining, data mining, collaborative filtering, etc. Search tools have received attention because of their capabilities to serve different information needs and achieve improved retrieval performance. Search tools are associated with such computer aspects as Web pages, users, queries, etc.

The present written description describes a variety of clustering algorithm embodiments for clustering data objects. Clustering of data objects is a technique by which large sets of data objects are grouped into a larger number of sets or clusters of data objects (with each of the larger number of clusters of data objects having fewer data objects). Each data object contained within a clustered group of data objects has some similarity. One aspect of clustering therefore can be considered as grouping of multiple data objects.

Figure 5:
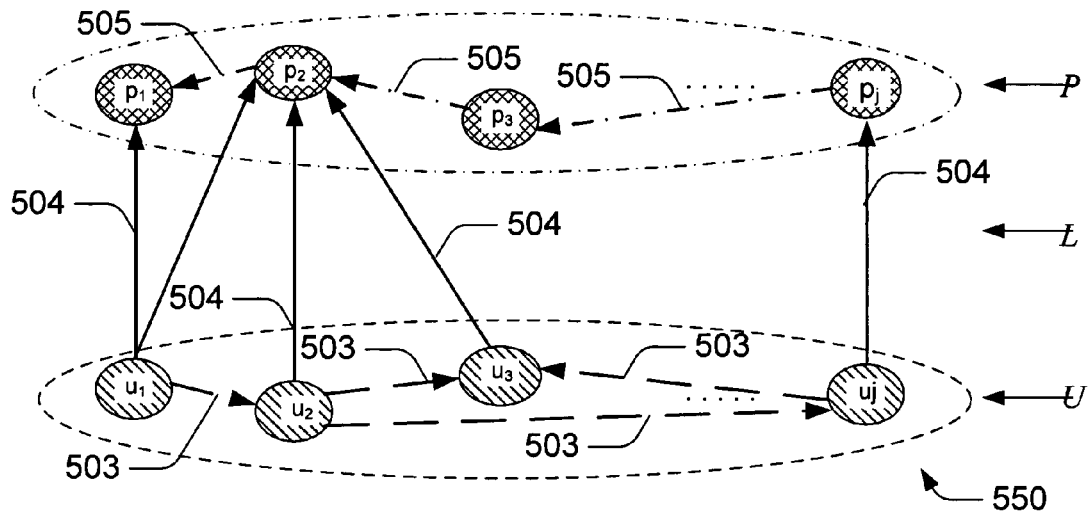
FIG. 5 is a block diagram of one embodiment of a framework for clustering heterogeneous objects.

One clustering mechanism described in this written description relates to a framework graph 550, one embodiment of the framework graph is illustrated in FIG. 5. Certain embodiments of a unified clustering mechanism are provided in which different types of objects are clustered between different levels or node sets P and U as shown in the framework graph 550 of FIG. 5. It is also envisioned that the concepts described in this written description can be applied to three or more layers, instead of the two layers as described in the written description. Each node set P and U may also be considered a layer. In this written description, the term "unified" clustering applies to a technique for clustering heterogeneous data. The node set P includes a plurality of data objects $p_1, p_2, p_3, \ldots, p_i$ that are each of a similar data type. The node set U includes a plurality of data objects $u_1, u_2, u_3, \ldots, u_j$ that are each of a similar data type. The data type of the objects clustered on each node set (P or U) is identical, and therefore the data objects in each node set (P or U) are homogenous. The type of the data objects $p_1, p_2, p_3, \ldots, p_i$ that are in the node set P are different from the types of the data objects $u_1, u_2, u_3, \ldots, u_j$ that are in the node set U. As such, the types of data objects that are in different ones of the node sets P and U are different, or heterogeneous. Certain aspects of this written description provide for clustering using inputs (based on links) from homogenous and heterogeneous data types of objects.

Links are illustrated in this written description by lines extending between a pair of data objects. Links represent the relationships between pairs of data objects in clustering. In one instance, a link may extend from a Web page object to a user object, and represent the user selecting certain Web pages. In another instance, a link may extend from a Web page object to another Web page object, and represent relations between different Web pages. In certain embodiments of clustering, the "links" are referred to as "edges". The generalized term "link" is used in this written description to describe links, edges, or any connector of one object to another object that describes a relationship between the objects.

There are a variety of different types of links (as described in this written description) that relate to clustering different types of objects that associate different ones of the objects as set forth in the framework graph 550. The links can be classified as either inter-layer link or intra-layer link. An intra-layer link 503 or 505 is one embodiment of link within the framework graph 550 that describes relationships between different objects of the same type. An inter-layer link 504 is one embodiment of link within the framework graph 550 that describes relationships between objects of different types. As shown in FIG. 5, there are a plurality of intra-layer links 503 extending between certain one of the data objects $u_1, u_2, u_3, \ldots, u_j$. In the embodiment shown in FIG. 5, there are also a plurality of intra-layer links 505 extending between certain ones of the data objects $p_1, p_2, p_3, \ldots, p_i$. In the embodiment shown in FIG. 5, there are also a plurality of inter-layer links 504 extending between certain ones of the data objects $u_1, u_2, u_3, \ldots, u_j$ in the node set P and certain ones of the data objects $p_1, p_2, p_3, \ldots, p_i$ in the node set U. Using inter-layer links recognizes that clustering of one type of object may be affected by another type of object. For instance, clustering of web page objects may be affected by user object configurations, state, and characteristics.

Figure 6:
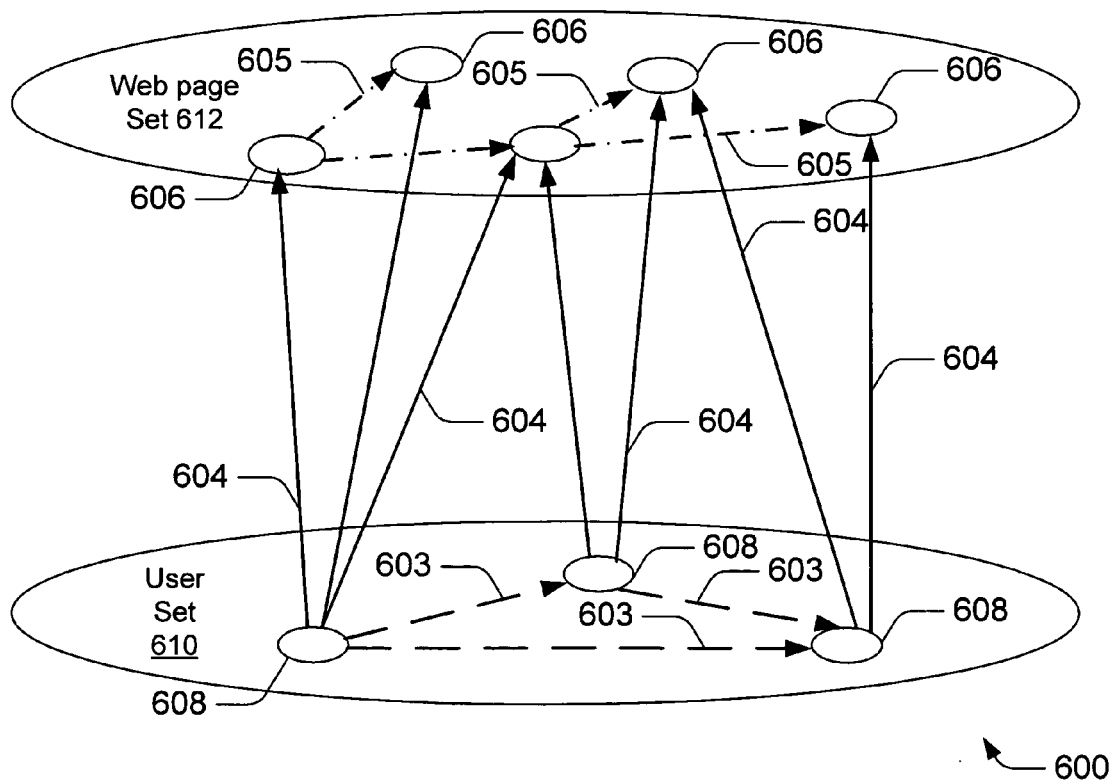
FIG. 6 is a block diagram of one embodiment of hybrid net model.

The link direction (as provided by the arrowheads for the links 503, 504, or 505 in FIG. 5, and also in FIG. 6) are illustrated as bi-directional since the relationships between the data objects may be directed in either direction. The links are considered illustrative and not limiting in scope. Certain links in the graph in the framework graph 550 may be more appropriately directed in one direction, the direction of the arrowhead typically does not affect the framework's operation. The framework graph 550 is composed of node set P, node set U, and link set L. With the framework graph 550, $p_i$ and $u_j$ represent two types of data objects, in which $p_i \in P$ (i=1, ..., I) and $u_j \in U$ (j=1, ..., J). I and J are cardinalities of the node sets P and U, respectively.

Links $(p_i, u_j) \in L$ are inter-layer links (which are configured as 2-tuples) that are illustrated by reference character 504 between different types of objects. Links $(p_i, p_j) \in L$ and $(u_i, u_j) \in L$, that are referenced by 505 and 503, respectively, are intra-layer links that extend between the same type of object. For simplicity, different reference characters are applied for inter-layer link sets (204) and intra-layer link sets (503, 505).

Using unified clustering, links are more fully utilized among objects to improve clustering. The clustering of the different types of objects in the different layers is reinforced by effective clustering. If objects are clustered correctly then clustering results should be more reasonable. Clustering can provide structuralized information that is useful in analyzing data.

The framework graph 550 illustrates clustering of multiple types of objects in which each type of objects is substantially identical (e.g., one type pertains to a group of web pages, a group of users, or a group of documents, etc.). The type of each group of objects generally differs from the type of other groups of the objects within the framework graph 550.

The disclosed clustering technique considers and receives input from different (heterogeneous) object types when clustering. One aspect of this written description is based on an intrinsic mutual relation in which the objects being clustered is provided with links to other objects. Certain ones of the links (and the objects to which those links connect) that connect to each object can be weighted with different importance to reflect their relevance to that object. For example, objects of the same types as those being clustered can be provided with greater importance than objects of a different type. This written description provides a mechanism by which varying levels of importance can be assigned to different objects or different types of objects. This assigning of different levels of importance to different objects (or different types of objects) is referred to herein as clustering with importance. The varying levels of importance of the different often results in improved clustering results and effectiveness.

In the embodiment of the framework graph 550 for clustering heterogeneous objects as shown in FIG. 5, the different node sets P or U represent different layers each containing different object types. The multiple node sets (P and U are illustrated) of the framework graph 550 provide a basis for clustering. The two-layered directed graph 550 contains a set of data objects to be clustered. Objects of each type of object types (that are to be clustered according to the clustering algorithm) can be considered as the instance of a "latent" class. The links 503, 504, or 505 that extend between certain ones of the object nodes reflect inherent relations among the object nodes that are provided by the clustering. An iterative projecting technique for clustering, several embodiments of which are described in this written description, enables separate clustering of objects that have separate data types to contribute to the clustering process.

The heterogeneous types of objects (and their associated links) are reinforced by using the iterative clustering techniques as described herein. The iterative clustering projection technique relies on obtaining clustering information from separate types of objects that are arranged in separate layers, with each layer containing a homogenous type of object. The node information in combination with the link information is used to iteratively project and propagate the clustered results (the clustering algorithm is provided between layers) until the clustering converges. Iteratively clustering results of one type of object into the clustering results of another type of object can reduce clustering challenges associated with data sparseness. With this iterative projecting, the similarity measure in one layer clustering is calculated on clusters instead of individual groups of clusters of another type.

Each type of the different kinds of nodes and links are examined to obtain structural information that can be used for clustering. Structural information, for example, can be obtained considering the type of links connecting different data objects (e.g., whether a link is an inter-layer link or an intra-layer link). The type of each object is indicated by its node set P or U, as indicated in FIG. 5.

The generalized framework graph 550 of FIG. 5 can be applied to a particular clustering application. Namely, the framework graph 550 can illustrate a group of Web pages on the Internet relative to a group of users. The Web page layer is grouped as the node set P. The user layer of objects is grouped as the node set U. The framework graph 550 integrates the plurality of Web page objects and the plurality of user objects in the representation of the two-layer framework graph 550. The framework graph 550 uses link (e.g., edge) relations 503, 504, 505 to facilitate the clustering of the different type of objects (as outlined by the generalized FIG. 5 framework graph). The link structure of the whole data set is examined during the clustering procedure to learn the different importance level of nodes. The nodes are weighted based on their importance in the clustering procedure to ensure that important nodes are clustered more reasonably.

In certain embodiments of the present written description, the links 503, 504, and 505 among clusters in the links are reserved. Reserved links are those links that extend between clusters of objects instead of the objects themselves. For example, one reserved link extends between a web-page cluster and a user cluster (instead of between a web page object and a user object as with the original links). In certain embodiments, the reserved links are maintained for a variety of future applications, such as a recommendation in the framework graph 550. E.g., the clustering result of Web page/user clustering with reserved links could be shown as a summary graph of user hits behaviors, which provides the prediction of user's hits.

The content of the respective nodes $p_i$ and $u_j$ are denoted by the respective vectors $f_i$ and $g_j$ (not shown in FIG. 5). Depending on the application, each individual node $p_i$ and $u_j$ may have (or may not have any) content features. Prior-art clustering techniques cluster the nodes $p_i$ independently from the nodes $u_j$. In contrast, in the clustering framework 550 described in this written description the nodes $p_i$ and the nodes $u_j$ are clustered dependently based on their relative importance. The clustering algorithm described herein uses a similarity function to measure distance between objects for each cluster type to produce the clustering. The cosine-similarity function as set forth in (1) can be used for clustering:

$$s_c(x, y) = \cos(f_x, f_y) = \frac{\sum_{i=1}^{kx} f_x(i) \cdot \sum_{i=1}^{ky} f_y(j)}{\sqrt{\sum_{i=1}^{kx} f_x^2(i)} \cdot \sqrt{\sum_{j=1}^{ky} f_y^2(j)}} \quad (1)$$

$$s_c(x, y) = \cos(f_x, f_y) = \frac{f_x \cdot f_y}{\|f_x\|\|f_y\|} = \frac{\sum\limits_{k, f_x(k) = f_y(k)} f_x(k) f_y(k)}{\sqrt{\sum\limits_{i=1}^{kx} f_x^2(i)} \cdot \sqrt{\sum\limits_{j=1}^{ky} f_y^2(j)}} \quad (2)$$

$f_x \cdot f_y$ is the dot product of two feature vector. It equals to the sum of weight product of the same component in fx and fy. $s_c$ denotes that the similarity is based on content feature; $f_x(i)$ and $f_y(j)$ are ith and jth components of the feature vector $f_x$ and $f_y$. kx is the number of items in the respective feature $f_x$; and ky is the number of items in the feature $f_y$.

In this written description, the node set P is used as an example to illustrate the inter-layer link 504 and the intra-layer links 503 and 505 of the nodes. All data is assumed to comprise a sequence of node pairs, for intra-layer node pairs $(p^{(1)}, p^{(1)}), (p^{(2)}, p^{(2)}), \ldots$ [where $p^{(1)}$ and $p^{(2)}$ are the same as $p_i$, and the pairs $(p^{(1)}, p^{(1)}), (p^{(2)}, p^{(2)})$, both stands for a node in the homogeneous layer] such as connected by links 503 or 505; and for inter-layer pairs $(p^{(1)}, u^{(1)}), (p^{(2)}, u^{(2)}), \ldots$ such as connected by links 504. Thus a link between a pair of nodes $(p_i, p_k)$ or $(p_i, u_j)$ represents one or more occurrence of identical pairs in the data series. The weight of the link relates to its occurrence frequency.

In this written description, two separate vectors represent features of the inter-layer links 504 and the intra-layer links 503, 505 for each particular node. For example, the intra-layer link 503, 505 features are represented using a vector whose components correspond to other nodes in the same layer. By comparison the inter-layer link 504 feature is represented using a vector whose components correspond to nodes in another layer. Each component could be a numeric value representing the weight of link from (or to) the corresponding node. For example, the inter-layer link 504 feature of nodes $p_1$ and $p_2$ (as shown in FIG. 5) can be represented as $[1, 0, 0, \ldots 0]^T$ and $[1, 1, 1, \ldots, 0]^T$, respectively.

Thus, the corresponding similarity function could be defined as cosine-similarity as above. The similarity function $s_{lx}(x,y)$ for intra-layer link 503, 505 features determines the similarity between nodes $p_1$ and $p_2$ is applied is described in (3) as follows:

$$s_{l_1}(x, y) = \cos(l_x \cdot l_y) = \frac{l_x \cdot l_y}{\|l_x\|\|l_y\|} \quad (3)$$

By comparison, the similarity function $s_{lx}(x,y)$ for inter-layer link 504 features determines the similarity between nodes $p_1$ and $u_2$ in (4) as follows:

$$s_{l2}(x, y) = \cos(h_x, h_y) \quad (4)$$

where $s_{l1}$ and $S_{l2}$ respectively denote that the similarities are based on respective intra-layer and inter-layer link features; $l_x$ and $l_y$ are intra-layer link feature vectors of node x and node y; while $h_x$ and $h_y$ are inter-layer link feature vectors of node x and node y.

Other representations of link features and other similarity measures could be used, such as representing links of each node as a set and applying a Jaccard coefficient. There are multiple advantages of the embodiments described herein. One advantage is that certain ones of the embodiments of clustering algorithms accommodate weighted links. Moreover, such clustering algorithms, as the k-means clustering algorithm, facilitate the calculation of the centroid of the clustering. The centroid is useful in further calculations to indicate a generalized value or characteristic of the clustered object.

The overall similarity function of node x and node y can be defined as the weighted sum of the three similarities including the three weighted values α, β, and γ as set forth in (5). There are two disclosed techniques to assign the three weighted values: heuristically and by training. If, for example, there is no tuning data, the weights are assigned manually to some desired value (e.g. alpha=0.5, beta=0.25, and gamma=0.25). If there is some extra tuning data, by comparison, then the weights can be calculated using a greedy algorithm, a hill-climbing algorithm, or some other type of either local or global improvement or optimizing program. A greedy algorithm refers to a type of optimization algorithm that seeks to improve each factor in each step, so that eventually an improved (and optimized in certain embodiments) solution can be reached.

$$s(x,y) = \alpha s_c(x,y) + \beta s_{l1}(x,y) + \gamma s_{l2}(x,y) \quad (5)$$

where $\alpha + \beta + \gamma = 1$.

Using these calculations, the content of the nodes, and the similarity of the nodes, are determined. Depending on the application, the three variables can be modified to provide different information values for the clustering algorithm. These contents and similarities of the nodes can thereupon be used as a basis for retrieval.

Many heterogeneous clustering problems often share the same property that the nodes are not equally important. Examples of heterogeneous clustering include Web page/user clustering, item/user clustering for collaborative filtering, etc. For these applications, important objects play an important role in getting more reasonable clustering results. In this written description, the link structure of the whole dataset is used to learn the importance of nodes. For each node in the node set P and U, for example $p_i$ and $u_j$, importance weights $ip_i$, and $iu_j$ are calculated by the link structure and are used in clustering procedure.

One clustering aspect relates a link analysis algorithm, multiple embodiments of which are provided in this written description. In one embodiment of the link analysis algorithm, a hybrid net model 600 as shown in FIG. 6 is constructed. Using the hybrid net model 600, the users and the Web pages are used as two illustrative types of nodes. The FIG. 6 embodiment of hybrid net model involving Web page and user types of objects is particularly directed to types of clustering involving the Internet, intranets, or other networks. The links include Web page hyperlinks/interactions as shown by link 605, user-to-Web page hyperlinks/interactions as shown by link 604, and user-to-user hyperlinks/interactions as shown by link 603. The hybrid net model 600 of FIG. 6 explicates these hyperlinks/relations by indicating the relations in and between users and Web pages that are illustrated by links 603, 604, and 605.

Given a certain group of users 608 that are contained within a user set 610, all Web pages that any of the nodes from the user set 610 have visited form the Web page set 612. The Web page set 612 is determined by sending the root Web page set to search engines and obtain a base Web page set. Three kinds of links represented by the arrows in FIG. 6 have different meanings. Those links represented by the arrows 605 that are contained within the Web page set 612 indicate hyperlinks between Web pages. Those links represented by arrows 603 that are contained within the user set 610 indicate social relations among users. Those links represented by arrows 604 that extend between the users set 610 and the Web page set 612 indicate the user's visiting actions toward Web pages. The links represented by arrows 604 indicate the user's evaluation of each particular Web page, so the authority/hub score of a Web page will be more credible. Since the different types of links 603, 604, and 605 represent different relations. Each link can be weighted with a different importance depending, for example, on how often the link is accessed or how each pair of nodes that are connected by the link are associated.

Figure 7:
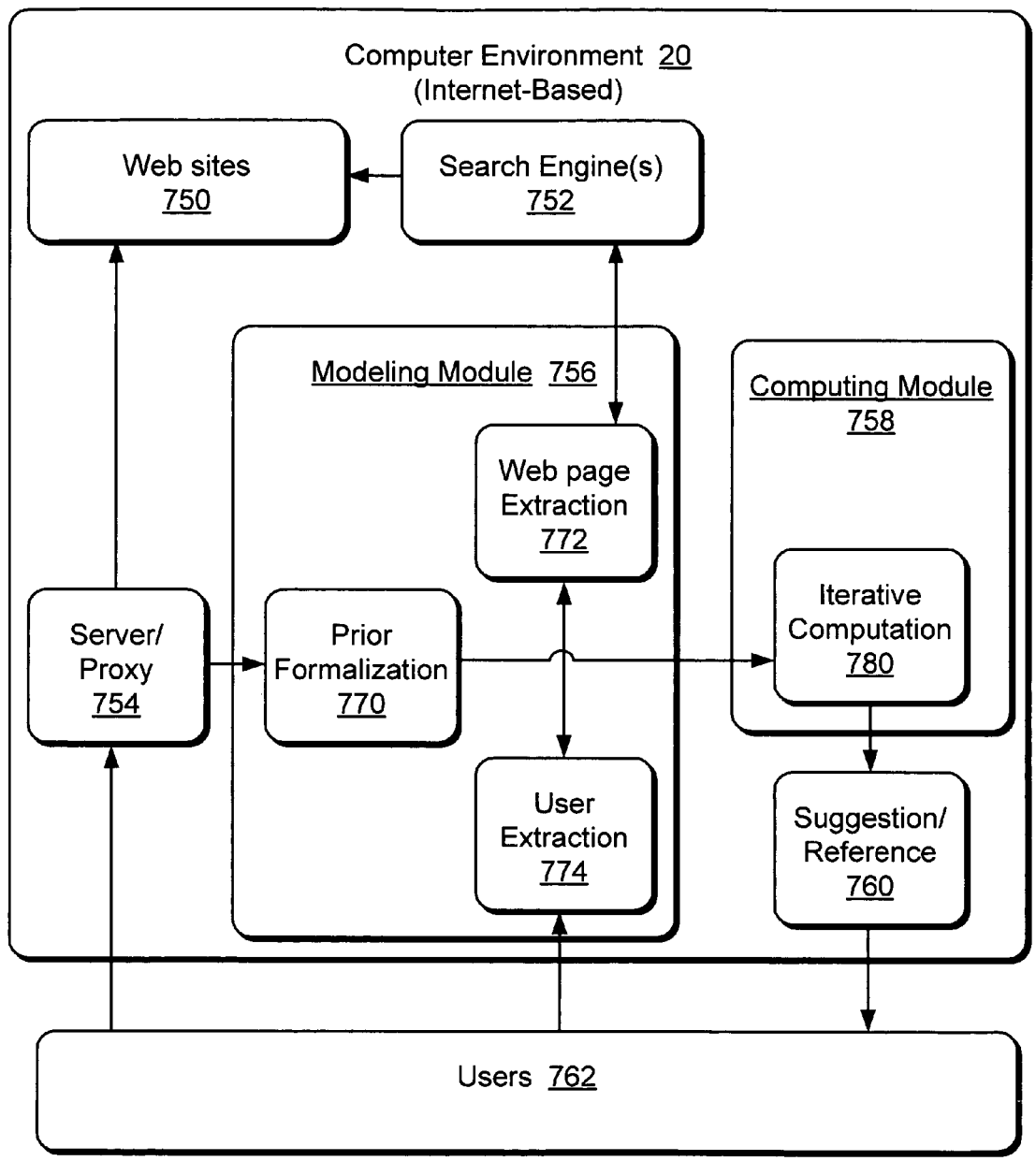
FIG. 7 is a block diagram of another embodiment of computer environment that is directed to the Internet.

FIG. 7 illustrates one embodiment of the computer environment 400 that is configured to perform clustering using the Internet. One aspect of such clustering may involve clustering the Web pages based on users (including the associated inter-layer links and the intra-layer links). The computer environment includes a plurality of Web sites 750, a search engine 752, a server/proxy portion 754, a modeling module 756, a computing module 758, and a suggestion/reference portion 760. The computer environment 400 interfaces with the users 762 such as with a graphical user interface (GUI). The computing module 758 includes an iterative computation portion 780 that performs the clustering algorithm (certain embodiments of which rely on iterative computation). The modeling module 756 acts to collect data and track data (e.g., associated with the objects). The search engines return search results based on the user's query. The Web sites 750 represent the data as it is presented to the user. The server/proxy communicates the queries and the like to a server that performs much of the clustering. The suggestion/reference portion 760 allows the user to modify or select the clustering algorithm.

The modeling module 756 includes a prior formalization portion 770, a webpage extraction portion 772, and a user extraction portion 774. Portions 770, 772, and 774 are configured to provide and/or track data that has been previously formalized 770, is extracted from a Web page, or is extracted from the user 762. The embodiment of computer environment as illustrated in FIG. 7 is configured to provide a link analysis algorithm, one embodiment of which is described in this written description.

One embodiment of clustering algorithm can analyze a Web graph by looking for two types of pages: hubs, authorities, and users. Hubs are pages that link to a number of other pages that provide useful relevant information on a particular topic. Authority pages are considered as pages that are relevant to many hubs. Users access each one of authorities and hubs. Each pair of hubs, authorities, and users thereby exhibits a mutually reinforcing relationship. The clustering algorithm relies on three vectors that are used in certain embodiments of the present link analysis algorithm: the web page authority weight vector a, the hub weight vector h, and the user vector u. Certain aspects of these vectors are described in this written description.

Several of the following terms relating to the following weight calculations are not illustrated in the figures such as FIG. 7, and instead relate to the calculations. In one embodiment, for a given user i, the user weight $u_i$ denotes his/her knowledge level. For a Web page j, respective terms $a_j$ and $h_j$ indicate the authority weight and the hub weight. In one embodiment, each one of the three vectors (representing the user weight u, the web page authority weight a, and the hub weight h) are each respectively initialized at some value (such as 1). All three vectors h, a, and u are then iteratively updated based on the Internet usage considering the following calculations as set forth respectively in (6), (7), and (8):

$$\begin{cases} a(p) = \sum_{q \to p} h(q) + \sum_{r \to p} u(r) & (6) \\ h(p) = \sum_{p \to q} a(q) + \sum_{r \to p} u(r) & (7) \\ u(r) = \sum_{r \to p} a(p) + \sum_{r \to q} h(q) & (8) \end{cases}$$

where, p and q stand for specific web-pages, and r stands for a specific user. There are two kinds of links in certain embodiments of the disclosed network: the links between different pages (hyperlinks) and the links between users and pages (browsing patterns). Let A=[$a_{ij}$] denote the adjacent matrix of the base set for all three vectors h, a, and u. Note that $a_{ij}$=1 if page i links to page j, or alternatively $a_{ij}$=0. V=[$v_{ij}$] is the visit matrix of the user set to Web page set. Consider that $v_{ij}$=1 if user i visit page j, or alternatively $v_{ij}$=0. Also, as set forth in (8), (10), and (11):

$$\begin{cases} a = A^T h + V^T u & (9) \\ h = Aa + V^T u & (10) \\ u = V(a + h) & (11) \end{cases}$$

In one embodiment, the calculation for vectors a, h, u as set forth in (9), (10), and (11) go through several iterations to provide meaningful results. Prior to the iterations in certain embodiments, a random value is assigned to each one of the vectors a, h, and u. Following each iteration, the values of a, h, u will be changed and normalized to provide a basis for the next iteration. Following each iteration, the iterative values of a, h, and u each tend to converge to a certain respective value. The users with high user weight ui and Web pages with high authority weight $a_j$ and/or hub weight $h_j$ can be reported. In a preferred embodiment, certain respective user or web-page objects can be assigned with higher values than other respective user or web-page objects. The higher the value is, the more importance is assigned to that object.

The embodiment of link analysis algorithm as described in this written description that can cluster thereby relies on iterative input from both Web pages and users. As such, weighted input from the user is applied to the clustering algorithm of the Web page. Using the weighted user input for the clustering improves the precision of the search results, and the speed at which the clustering algorithm can be performed.

While the link analysis algorithm described herein is applied to clustering algorithms for clustering Web pages based on users, it is envisioned that the link analysis algorithm can be applied to any heterogeneous clustering algorithm. This weighting partially provides for the clustering with importance as described herein.

A variety of embodiments of a clustering algorithm that can be used to cluster object types are described. Clustering algorithms attempt to find natural groups of data objects based on some similarity between the data objects to be clustered. As such, clustering algorithms perform a clustering action on the data objects. Certain embodiments of clustering algorithm also finds the centroid of a group of data sets, which represents a point whose parameter values are the mean of the parameter values of all the points in the clusters. To determine cluster membership, most clustering algorithms evaluate the distance between a point and the cluster centroid. The output from a clustering algorithm is basically a statistical description of the cluster centroids with the number of components in each cluster.

Multiple embodiments of cluster algorithms are described in this written description. The two-ways k-means cluster algorithm is based on the mutual reinforcement of clustering process. The two-ways k-means cluster algorithm is an iterative clustering algorithm. In the two-ways k-means cluster algorithm, the object importance is first calculated by (6)-(8) or (9)-(11), and the result is then applied in the followed iterative clustering procedure. The clustering algorithm clusters objects in each layer based on the defined similarity function. Although a great deal of clustering algorithms, such as k-means, k-medoids, and agglomerative hierarchical methods could be used, this written description describes the application of the k-means clustering algorithm.

There are several techniques to apply the calculated importance score of nodes. One technique involves modifying the basic k-means clustering algorithm to a 'weighted' k-means algorithm. In the modified k-means algorithm, the centroid of the given cluster is calculated using the weighted sum of the features with the weight setting determining the importance score. The nodes having a higher importance or weighting are thereby given more emphasis in forming the cluster centroid for both the content and the link features. Another embodiment involves modifying the nodes' link weight by their importance score, and then using the weighted link feature in the similarity function. In this way, the importance of the nodes is only reflected in the link feature in clustering process.

Figure 8:
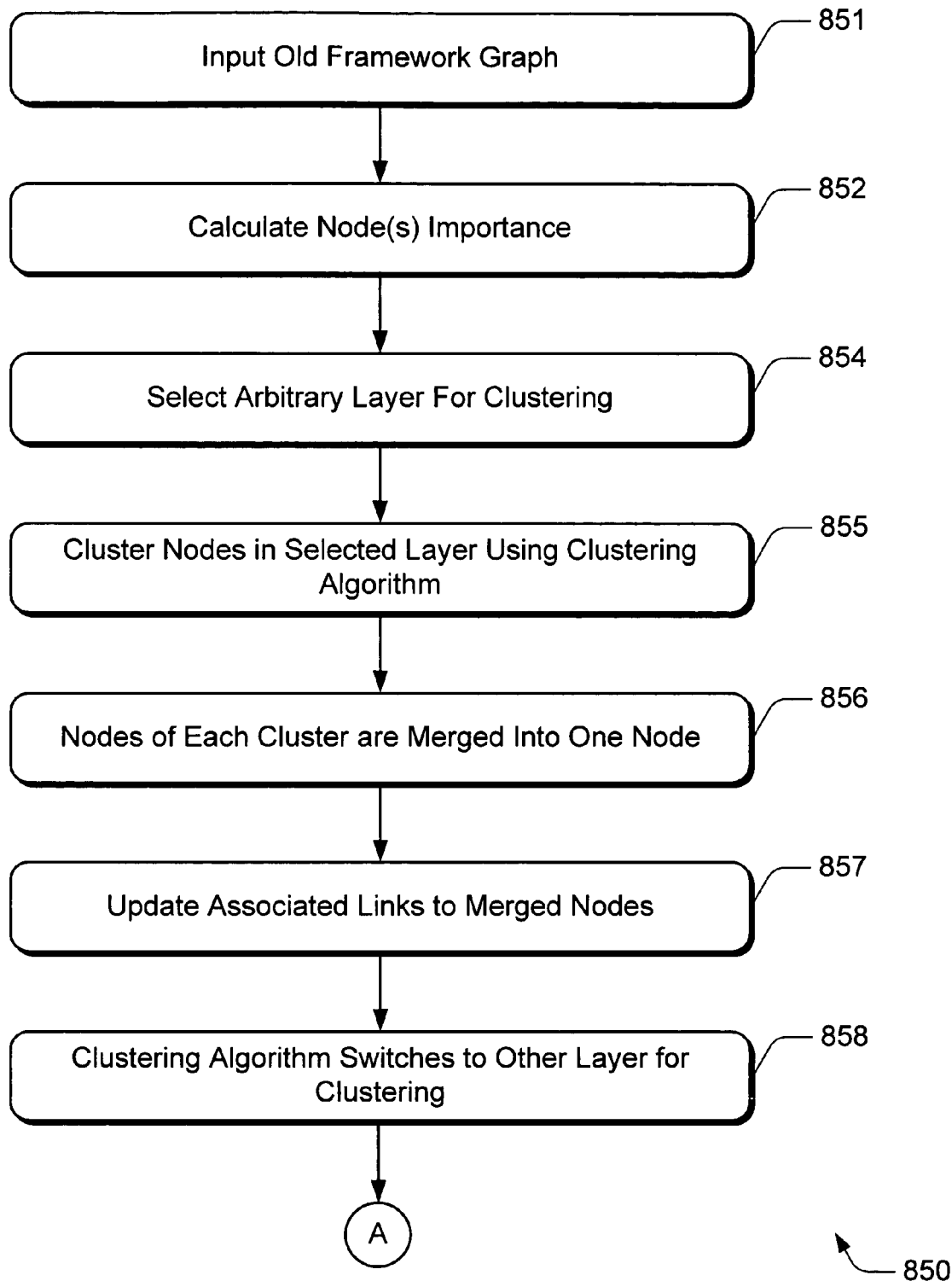
FIG. 8 is a flow chart of one embodiment of clustering algorithm.
Figure 9:
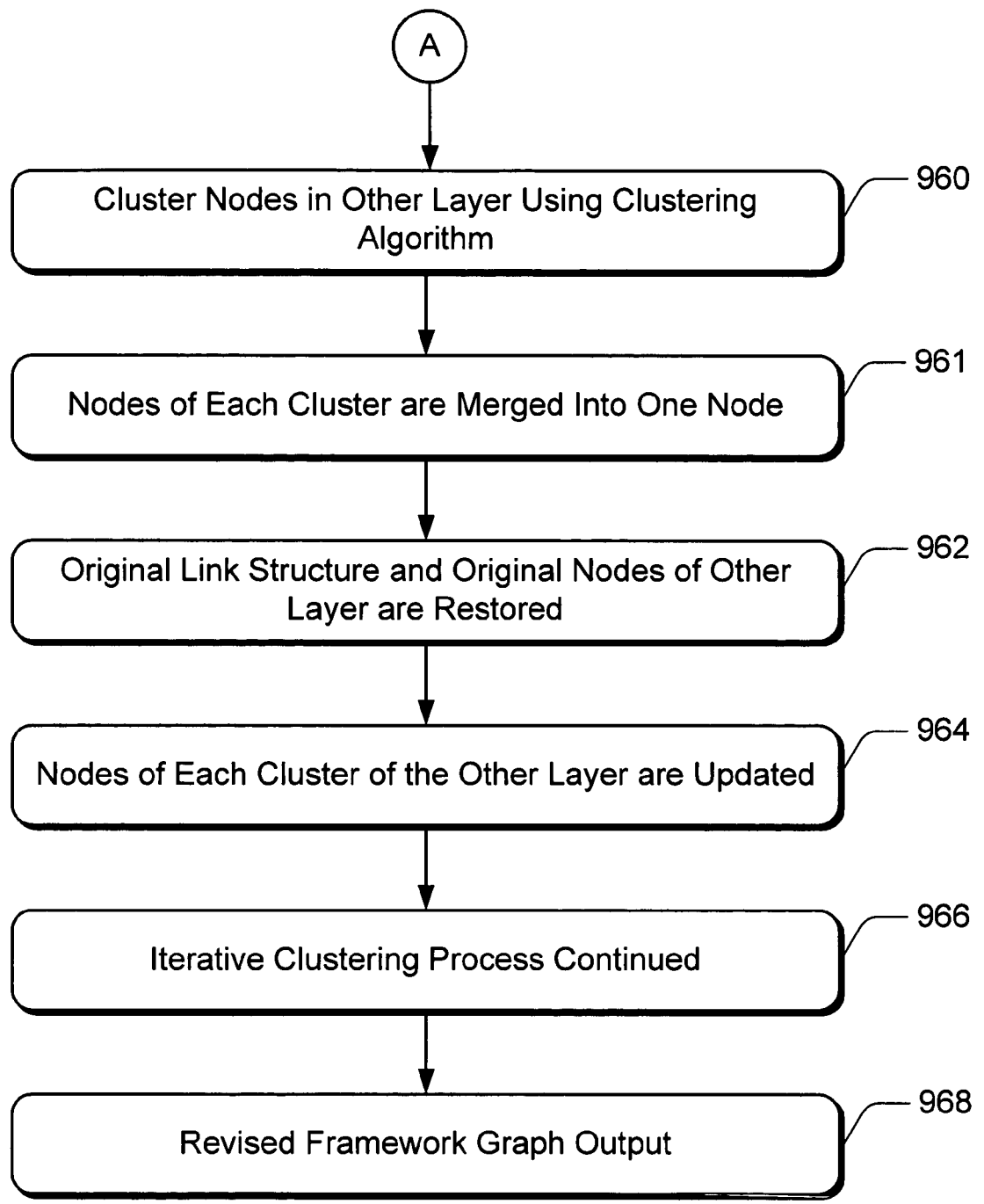
FIG. 9 is a flow chart of one embodiment of clustering algorithm.

One embodiment of the input/output of the clustering algorithm is shown in FIGS. 8 and 9. The input to the clustering algorithm includes a two-layered framework graph 550 (including the content features $f_i$ and $g_j$ of the nodes). The output to the clustering algorithm includes a new framework graph 550 that reflects the clustering. In certain embodiments of the new framework graph, the variations of each old node that has changed into its new node position can be illustrated.

One embodiment of a flow chart illustrating one embodiment of the clustering algorithm 850 is shown in FIGS. 8 and 9. The clustering algorithm 850 includes 851 in which the original framework graph (prior to each clustering iteration) is input. In 852, the importance of each node being considered is determined or calculated using (6)-(8) or (9)-(11). In 854, an arbitrary layer is selected for clustering. Nodes in the selected layer are clustered in an appropriate fashion (e.g., according to content features) in 855. In certain embodiments, the nodes can be filtered using a desired filtering algorithm (not shown) to improve the clustering. In 856, the nodes of each cluster are merged into one node. For instance, if two candidate nodes exist following the filtering, the closest two candidate nodes can be merged by, e.g., averaging the vector values of the two candidate nodes. This merging allows individual nodes to be combined to reduce the number of nodes that have to be considered. As such, the merging operation can be used to reduce the occurrence of duplicates and near-duplicates.

The corresponding links are updated based on the merging in 857. In 858, the clustering algorithm switches to a second layer (from the arbitrarily selected layer) for clustering. In 960, the nodes of the second layer are clustered according to their content features and updated link features. In 961, the nodes of each cluster are merged into one node.

In 962, the original link structure and the original nodes of the other layer are restored. In 964, the nodes of each cluster of the second layer are merged, and the corresponding links are updated. In 966, this iterative clustering process is continued within the computer environment. In 968, a revised version of the framework graph 550 is output.

In the initial clustering pass, only the content features are utilized. Because in most cases the link feature are too sparse in the beginning to be useful for clustering. In subsequent clustering passes, content features and link features are combined to enhance the effectiveness of the clustering. By combining the content features and the link features, the weights are specified with different values and the results can be compared, and clustering having an improved accuracy can be provided.

The clustering algorithm as described relative to FIGS. 8 and 9 can be applied to many clustering embodiments. More particularly, one embodiment of clustering of Web pages based on how the Web pages are accessed by users is now described. In those types of link extends between a node of the user layer to a node of the Web page layer, a user $u_j$ has visited a Web page $p_i$ before if there is one link from $u_j$ to $p_i$. The weight of the link means the probability that the user $u_j$ will visit the page $p_i$ at a specific time, denoted as $Pr(p_i|u_j)$. It can be simply calculated by counting the numbers within the observed data, as shown in (12).

$$Pr(p_i \mid u_j) = \frac{C(p_i, u_j)}{\sum_{t \in P(u_j)} C(p_t, u_j)} \quad (12)$$

where, $P(u_j)$ is the set of pages that visited by the user $u_j$ before. $C(p_i, u_j)$ stands for the count that the user $u_j$ have visited page $p_i$ before.

Figure 10:
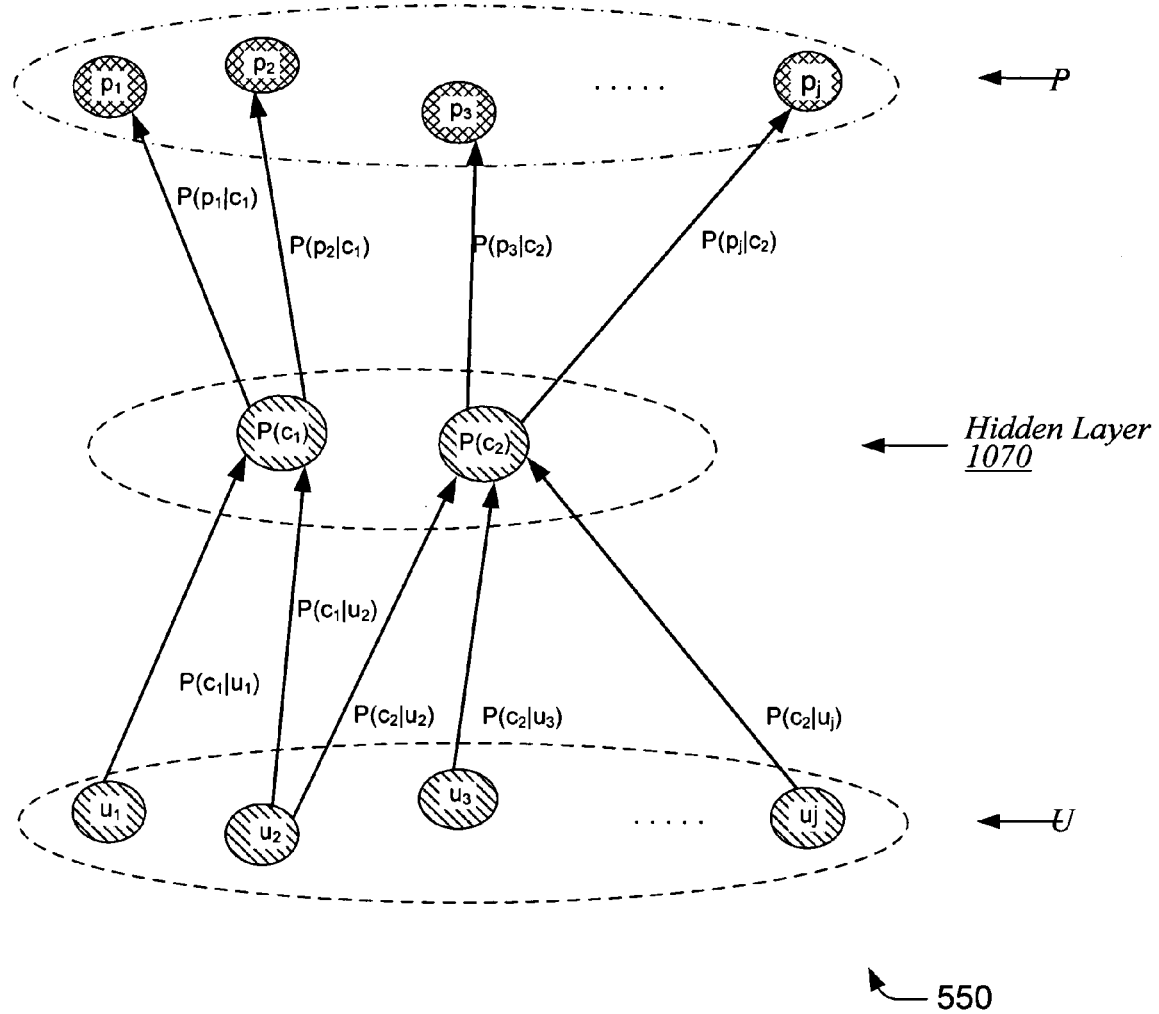
FIG. 10 is a block diagram of another embodiment of a framework for clustering heterogeneous objects that includes a hidden layer.

One embodiment of clustering algorithm, as shown in the embodiment of framework graph 550 of FIG. 10, involves a concept layer or hidden layer. In FIG. 10, for simplicity, the intra-layer link 503 and 505 that are shown in the framework graph of FIG. 5 are hidden. It is envisioned, however, that the embodiment of framework graph 550 as shown in FIG. 10 can rely on any combination of intra-layer links and inter-layer links and still remain within the concepts of the present written description.

The hidden layer 1070 (in the embodiment of framework graph 550 as displayed in FIG. 10) lies between web-page layer and user layer. The hidden layer 550 provides an additional layer of abstraction (from which links extend to each of the node sets P and U) that permit modeling with improved realism compared to extending links between the original node sets P and U. One of the inter-layer links 504 of the embodiment of framework graph 550 such as shown in FIG. 5 (that does not have a hidden layer) may be modeled as a pair of hidden inter-layer links of the embodiment of framework graph 550 such as shown in FIG. 10. One of the hidden inter-layer links extends between the web-page layer containing the node set P and the hidden layer 1070, and one of the hidden inter-layer links extends between the user layer and the hidden layer 1070. The direction of the arrows on each hidden inter-layer link shown in FIG. 10 is arbitrary, as is the particular web pages and users in the respective node sets P and U that are connected by a hidden inter-layer link to a node in the hidden layer.

Links (i.e., hidden inter-layer links) that extend between the web-page layer containing the node set P and the hidden layer 1070 indicate how likely a web-page $p_1$, $p_2$ etc. belongs to a particular concept node $P(c_1)$, $P(c_2)$, etc. in the hidden layer 1070. Links (i.e., hidden inter-layer links) that extend between the user layer and the hidden layer 1070 indicate how likely a user node $u_1$, $u_2$, etc. has interest in a particular concept node $P(c_1)$, $P(c_2)$, etc. within the hidden layer 1070.

The links that extend between the web-page layer and the concept layer therefore each stand for the probability that a Web page $p_i$ is classified into a concept category $c_k$, denoted as $Pr(p_i|c_k)$. This model embodied by the framework graph shares the assumption used by Naïve Bayesian classification, in which different words are considered conditionally independent. So the concept $c_k$ can be represented as a normal distribution, i.e. a vector $\vec{\mu}_k$ for expectation and a $\vec{\sigma}_k$ vector for covariance. The value $Pr(p_i|c_k)$ can be derived as per (13).

$$E(Pr(p_i|c_k)) = \frac{Pr(p_i|c_k)}{\sum_t Pr(p_t|c_k)} \qquad (13)$$

$$= \frac{\prod_l Pr(w_{l,i}|c_k)}{\sum_t \prod_l Pr(w_{l,t}|c_k)}$$

$$= \frac{e^{-\sum_l \frac{1}{2\sigma_{l,k}}(w_{l,i}-\mu_{l,k})^2}}{\sum_t e^{-\sum_l \frac{1}{2\sigma_{l,k}}(w_{l,k}-\mu_{l,k})^2}},$$

where $w_{l,i}$ is the weight of web page $p_i$ on the lth word.

Those links (denoted as $Pr(c_k|u_j)$) that extend between a node in the user layer and a node in the hidden layer reflect the interest of the user in the category reflected by the concept. Thus, one vector $(I_{j1}, I_{j2}, \ldots, I_{jn})$, $I_{jk}=Pr(c_k|u_j)$ corresponds to each user, in which n is the number of the hidden concept. The links shown in FIG. 10 can be considered as the vector models of the user. The vector is constrained by the user's usage data as set forth in (14).

$$Pr(p_i|u_j) = \sum_l Pr(p_i|c_l, u_j)Pr(c_l|u_j) \qquad (14)$$

$$\approx \sum_l Pr(p_i|c_l)Pr(c_l|u_j)$$

Thus, the value $Pr(c_k|u_j)$ can be obtained by finding the solution from (13).

To simplify, $Pr(p_i|u_j)=R_{i,j}$, $Pr(p_i|c_k)=S_{i,k}$, and $Pr(c_k|u_j)=T_{k,j}$. The user j can be considered separately as set forth in (15).

$$\begin{bmatrix} R_{1,j} \\ R_{2,j} \\ \ldots \\ R_{|Page|,j} \end{bmatrix} = \begin{bmatrix} S_{1,1} & S_{1,2} & \ldots & S_{1,|Concept|} \\ S_{2,1} & S_{2,2} & & \\ \ldots & & & \\ S_{|Page|,1} & & \ldots & S_{|Page|,|Concept|} \end{bmatrix} \times \begin{bmatrix} T_{1,j} \\ T_{2,j} \\ \ldots \\ T_{|Concept|,j} \end{bmatrix} \qquad (15)$$

where "|Page|" is the total number of the Web pages, and "|Concept|" is the total number of the hidden concept. Since |Page|>>|Concept|, a least square solution of $T_{k,j}$ can be solved using (15), or alternatively (16).

$$[R_{i,1} \quad R_{i,2} \quad \ldots \quad R_{i,|User|}] = \qquad (16)$$

$$[S_{i,1} \quad S_{i,2} \quad \ldots \quad S_{i,|Concept|}] \times \begin{bmatrix} T_{1,1} & T_{1,2} & \ldots & T_{1,|User|} \\ T_{2,1} & T_{2,2} & & \\ \ldots & & \ldots & \\ T_{|Concept|,1} & & & T_{|Concept|,|User|} \end{bmatrix}$$

where "|User|" is the total number of the users.

Since |User|>>|Concept|, we can also give a least square solution of $S_{i,k}$ as set forth in (17).

$$\vec{\mu}_j = \sum_t \vec{P}_t Pr(p_t|c_k) = \sum_k S_{t,k} \vec{P}_t \qquad (17)$$

After the vector for expectation $\vec{\mu}_j$ is obtained, a new vector for covariance $\vec{\sigma}_j$ can be calculated. While the embodiment of framework graph 550 that is illustrated in FIG. 10 extends between the node set P and the node set U, it is envisioned that the particular contents of the node sets are illustrative in nature, and can be applied to any set of node sets.

Figure 11:
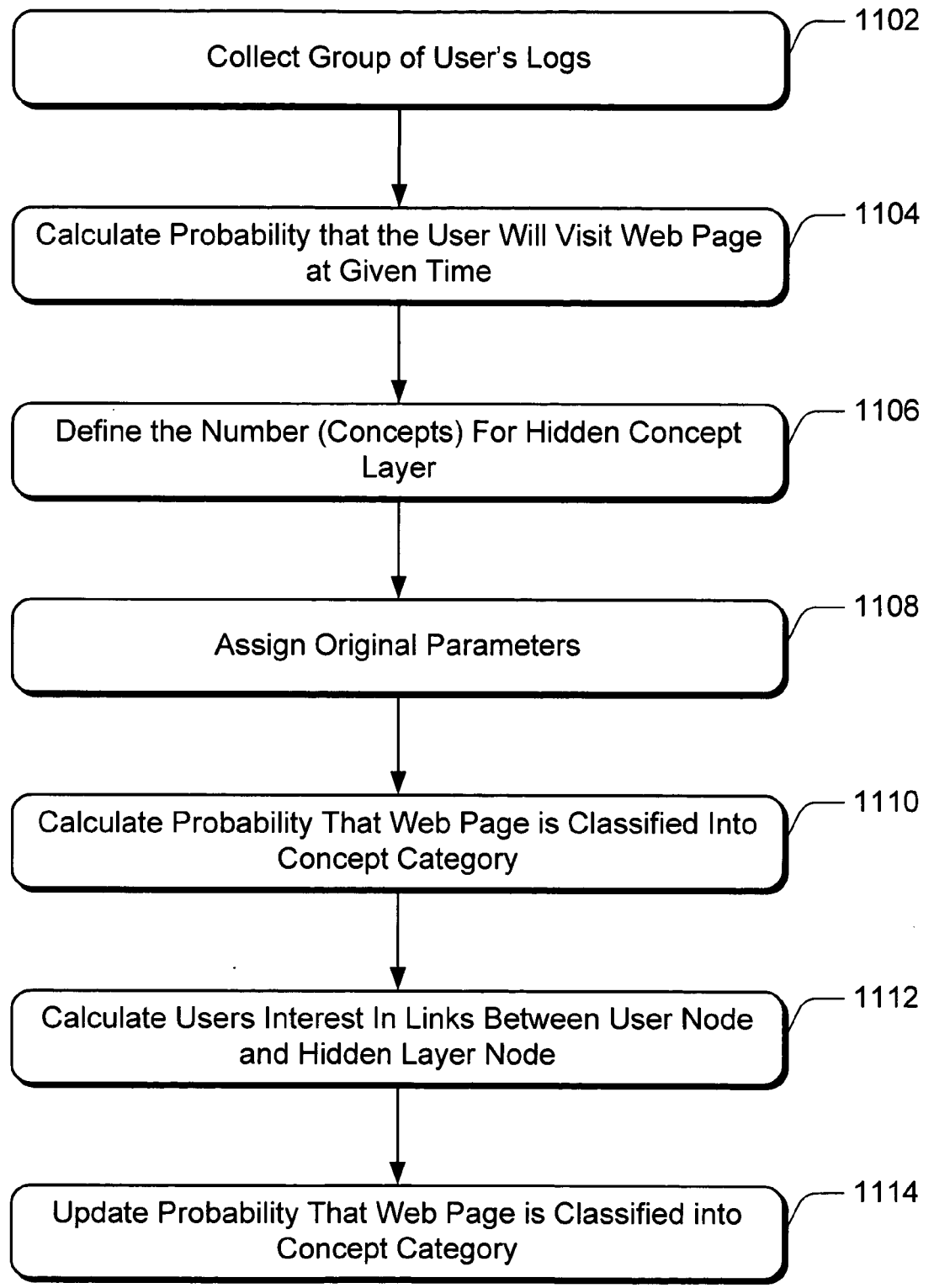
FIG. 11 is a flow chart of another embodiment of clustering algorithm.

One embodiment of the clustering algorithm in which Web page objects are clustered based on user objects can be outlined as follows as described relative to one embodiment of Web page clustering algorithm shown as 1100 in FIG. 11:

1. Collect a group of users' logs as shown in 1102.
2. Calculate the probability of the user $u_j$ will visit the Web page $p_i$ at a specific time $Pr(p_i|u_j)$ as set forth by (12), and 1104 in FIG. 11.
3. Define the number |Concept| of nodes for the hidden concept layer (670 as shown in FIG. 10) in 1106 of FIG. 11, and randomly assign the initial parameters for the vector for expectation $\vec{\mu}_k$ and the initial vector for covariance $\vec{\sigma}_k$ in 1108 of FIG. 11.
4. Calculate a $Pr(p_i|c_k)$ value, which represents the probability that a, Web page $p_i$ is classified into a concept category $c_k$, as set forth in (13) and 1110 in FIG. 11.
5. Calculate $Pr(c_k|u_j)$, which represents the users interest in the links between a user node and a hidden layer node, which can be derived by (15) as shown in 1112 in FIG. 11.
6. Update the $Pr(p_i|c_k)$ probability that a Web page is classified into a concept category as determined in the outline step 4 by solving (13) as shown in 1114 of FIG. 11.
7. Re-estimate the parameters for each hidden concept node by using $Pr(p_i|c_k)$ as set forth in (13).
8. Go through (13) and (15) for several iterations to provide some basis for the values of the node sets (or at least until the model displays stable node set vector results).

The invention claimed is:

1. A method providing computer-implemented content propagation for enhanced document retrieval, the method comprising:
   identifying reference information directed to one or more documents, wherein the reference information identified from one or more sources of data, is independent from a data source comprising the one or more documents;

extracting metadata that is proximally located to the reference information, which is surrounding the reference information and is semantically or contextually related to the reference information;

calculating relevance between respective features of the metadata to content of associated ones of the one or more documents;

indexing associated portions of the metadata with the relevance of features from the respective portions along with relevance scores, into original content of the document, for each document of the one or more documents, wherein the indexing generates one or more enhanced documents;

analyzing the one or more enhanced documents to locate relevance information based on a search query;

ranking the one or more enhanced documents based on relevance scores;

communicating ranked results and snippet descriptions for the one or more enhanced documents, based on the search query;

wherein the one or more sources of data comprise a search query log, and wherein calculating relevance further comprises:

identifying search queries from the search query log, wherein the search queries have a relatively high frequency of occurrence (FOO) to search the data source;

determining article(s) selected by an end-user from search query results, the article(s) being from the data source; and determining missing end-user selection(s), where a missing end-user selection is an article in the search query results that was not selected;

wherein determining missing end-user selection(s) further comprises clustering heterogeneous objects using interlayer links to determine importance measurements for features of the heterogeneous objects, the heterogeneous object comprising a first cluster of similar queries and a second cluster of related documents, the similar queries having been identified in the search query log, the similar queries being associated search result(s) comprising the one or more documents, the related documents being identified in the search result(s) independent of whether individual ones of the related documents were selected by an end-user from the search results.

2. A method as recited in claim 1, wherein the reference information comprises at least one of a link or substantially unique document ID associated with a document of the one or more documents.

3. A method as recited in claim 1, wherein the one or more documents comprise at least one of knowledge base article(s), product help, task, or developer data.

4. A method as recited in claim 1, wherein the one or more sources of data comprise at least one of service request(s), newsgroup posting(s), or search query log(s).

5. A method as recited in claim 1, wherein the metadata comprises at least one of semantically or contextually related to associated ones of the one or more documents.

6. A method as recited in claim 1, wherein the metadata comprises at least one of a title of a document, product problem context, or product problem resolution information.

7. A method as recited in claim 1, wherein for each enhanced document of the one or more enhanced documents, there is a corresponding original document from which the enhanced document was generated.

8. A method as recited in claim 1, wherein calculating the relevance is based on how many times a particular document of the one or more documents is identified within its context in the metadata.

9. A method as recited in claim 1, wherein the metadata comprises at least one of article title(s), product problem context, or product problem resolution information, and wherein calculating relevance further comprises weighting the article title(s) or product problem context to indicate a greater relevance than any product problem resolution information.

10. A method as recited in claim 1, wherein calculating relevance further comprises assigning greater relevance to feature(s) of the metadata that occur in content of the data source with greater frequency as compared to the frequency of occurrence of other metadata features in the content.

11. A method as recited in claim 1, wherein calculating relevance further comprises assigning greater weight to feature(s) of the metadata found in a document of the one or more documents as a function of an age of the document.

12. A method as recited in claim 1, wherein the features are represented with respective nodes in the first and second clusters, and wherein the importance measurement(s) for each of the nodes is based on a similarity function that measures a distance between objects in the first and second clusters.

13. A computer-readable storage medium comprising computer-executable instructions providing content propagation for enhanced document retrieval, the computer-executable instructions comprising instructions for:

identifying reference information directed to one or more documents, wherein the reference information identified from one or more sources of data, is independent from a data source comprising the one or more documents;

extracting metadata that is proximally located to the reference information, which is surrounding the reference information and is semantically or contextually related to the reference information;

calculating relevance between respective features of the metadata to content of associated ones of the one or more documents;

indexing associated portions of the metadata with the relevance of features from the respective portions along with relevance scores, into original content of the document, for each document of the one or more documents, wherein the indexing generates one or more enhanced documents;

analyzing one or more enhanced documents to locate relevance information based on a search query;

ranking one or more enhanced document retrieval based on relevance scores;

communicating ranked results and snippet descriptions for enhanced document, retrieval, based on the search query;

wherein the one or more sources of data comprise a search query log, and wherein the instructions for calculating relevance further comprise instructions for:

identifying search queries from the search query log, wherein the search queries have a relatively high frequency of occurrence (FOO) to search the data source;

determining article(s) selected by an end-user from search query results, the article(s) being from the data source; and determining missing end-user selection(s), where a missing end-user selection is an article in the search query results that was not selected;

wherein the instructions for determining missing end-user selection(s) further comprise instructions for clustering heterogeneous objects using inter-layer links to determine importance measurements for features of the heterogeneous objects, the heterogeneous object comprising a first cluster of similar queries and a second cluster of related documents, the similar queries having been identified in the search query log, the similar queries being associated search result(s) comprising the one or more documents, the related documents being identified in the search result(s) independent of whether individual ones of the related documents were selected by an end-user from the search results.

14. The computer-readable storage medium of claim 13, wherein the reference information comprises at least one of a link or substantially unique document ID associated with a document of the one or more documents.

15. The computer-readable storage medium of claim 13, wherein the one or more documents comprises at least one of knowledge base article(s), product help, task, or developer data.

16. The computer-readable storage medium of claim 13, wherein the one or more sources of data comprise at least one of service request(s), newsgroup posting(s), or search query log(s).

17. The computer-readable storage medium of claim 13, wherein the metadata is semantically or contextually related to associated ones of the one or more documents.

18. The computer-readable storage medium of claim 13, wherein the metadata comprises at least one of a title of a document, product problem context, or product problem resolution information.

19. The computer-readable storage medium of claim 13, wherein for each enhanced document of the one or more enhanced documents, there is a corresponding original document from which the enhanced document was generated.

20. The computer-readable storage medium of claim 13, wherein calculating the relevance is based on how many times a particular document of the one or more documents is identified within its context in the metadata.

21. The computer-readable storage medium of claim 13, wherein the metadata comprises at least one of article title(s), product problem context, or product problem resolution information, and wherein the instructions for calculating relevance further comprise instructions for weighting the article title(s) or product problem context to indicate a greater relevance than any product problem resolution information.

22. The computer-readable storage medium of claim 13, wherein the instructions for calculating relevance further comprise instructions for assigning greater relevance to feature(s) of the metadata that occur in content of the data source with greater frequency as compared to the frequency of occurrence of other metadata features in the content.

23. The computer-readable storage medium of claim 13, wherein the instructions for calculating relevance further comprise instructions for assigning greater weight to feature(s) of the metadata found in a document of the one or more documents as a function of an age of the document.

24. The computer-readable storage medium of claim 13, wherein the features are represented with respective nodes in the first and second clusters, and wherein the importance measurement(s) for each of the nodes is based on a similarity function that measures a distance between objects in the first and second clusters.

25. A computing device providing content propagation for enhanced document retrieval, the computing device comprising:

a processor; and a memory coupled to the processor, the memory comprising computer-program instructions executable by the processor for:

identifying reference information directed to one or more documents, wherein the reference information identified from one or more sources of data, is independent from a data source comprising the one or more documents;

extracting metadata that is proximally located to the reference information, which is surrounding the reference information and is semantically or contextually related to the reference information;

calculating relevance between respective features of the metadata to content of associated ones of the one or more documents;

indexing associated portions of the metadata with the relevance of features from the respective portions along with relevance scores, into original content of the document, for each document of the one or more documents, wherein the indexing generates one or more enhanced documents;

analyzing one or more enhanced documents to locate relevance information based on a search query;

ranking one or more enhanced document retrieval based on relevance scores;

communicating ranked results and snippet descriptions for enhanced document, retrieval, based on the search query;

wherein the one or more sources of data comprise a search query log, and wherein the instructions for calculating relevance further comprise instructions for:

identifying search queries from the search query log, wherein the search queries have a relatively high frequency of occurrence (FOO) to search the data source;

determining article(s) selected by an end-user from search query results, the article(s) being from the data source; and determining missing end-user selection(s), where a missing end-user selection is an article in the search query results that was not selected;

wherein the instructions for determining missing end-user selection(s) further comprise instructions for clustering heterogeneous objects using inter-layer links to determine importance measurements for features of the heterogeneous objects, the heterogeneous object comprising a first cluster of similar queries and a second cluster of related documents, thc similar queries having been identified in the search query log, the similar queries being associated search result(s) comprising the one or more documents, the related documents being identified in the search result(s) independent of whether individual ones of the related documents were selected by an end-user from the search results.

26. The computing device of claim 25, wherein the reference information comprises at least one of a link or substantially unique document ID associated with a document of the one or more documents.

27. The computing device of claim 25, wherein the one or more documents comprise at least one of knowledge base article(s), product help, task, or developer data.

28. The computing device of claim 25, wherein the one or more sources of data comprise at least one of service request(s), newsgroup posting(s), or search query log(s).

29. The computing device of claim 25, wherein the metadata is at least one of semantically or contextually related to associated ones of the one or more documents.

30. The computing device of claim 25, wherein the metadata comprises at least one of a title of a document, product problem context, or product problem resolution information.

31. The computing device of claim 25, wherein for each enhanced document of the one or more enhanced documents, there is a corresponding original document from which the enhanced document was generated.

32. The computing device of claim 25, wherein calculating the relevance is based on how many times a particular document of the one or more documents is identified within its context in the metadata.

33. The computing device of claim 25, wherein the metadata comprises at least one of article title(s), product problem context, or product problem resolution information, and wherein the instructions for calculating relevance further comprise instructions for weighting the article title(s) or product problem context to indicate a greater relevance than any product problem resolution information.

34. The computing device of claim 25, wherein the instructions for calculating relevance further comprise instructions for assigning greater relevance to feature(s) of the metadata that occur in content of the data source with greater frequency as compared to the frequency of occurrence of other metadata features in the content.

35. The computing device of claim 25, wherein the instructions for calculating relevance further comprise instructions for assigning greater weight to feature(s) of the metadata found in a document of the one or more documents as a function of an age of the document.

36. The computing device of claim 25, wherein the features are represented with respective nodes in the first and second clusters, and wherein the importance measurement(s) for each of the nodes is based on a similarity function that measures a distance between objects in the first and second clusters.

37. A computing device providing content propagation for enhanced document retrieval, the computing device comprising:
a processor; and
a memory coupled to the processor, the memory comprising computer-program instructions executable by the processor for:
identifying means to identify reference information directed to one or more documents, wherein the reference information identified from one or more sources of data, is independent from a data source comprising the one or more documents;
extracting metadata that is proximally located to the reference information, which is surrounding the reference information and is semantically or contextually related to the reference information;
calculating relevance between respective features of the metadata to content of associated ones of the one or more documents;
indexing associated portions of the metadata with the relevance of features from the respective portions along with relevance scores, into original content of the document, for each document of the one or more documents;
wherein the indexing generates one or more enhanced documents;
analyzing means to analyze one or more enhanced documents to locate relevance information based on a search query;
ranking means to rank one or more enhanced document retrieval based on relevance scores; and
communicating means to communicate ranked results and snippet descriptions for enhanced document, retrieval, based on the search query;
wherein the calculating means further comprise clustering means to cluster heterogeneous objects using interlayer links to determine importance measurements for features of the heterogeneous objects, the heterogeneous object comprising a first cluster of similar queries and a second cluster of related documents, the similar queries having been identified in the search query log, the similar queries being associated search result(s) comprising the one or more documents, the related documents being identified in the search result(s) independent of whether individual ones of the related documents were selected by an end-user from the search results.

38. The computing device of claim 37, wherein the reference information comprises at least one of a link or substantially unique document ID associated with a document of the one or more documents.

39. The computing device of claim 37, wherein the one or more documents comprise at least one of knowledge base article(s), product help, task, or developer data.

40. The computing device of claim 37, wherein the one or more sources of data comprise at least one of service request(s), newsgroup posting(s), or search query log(s).

41. The computing device of claim 37, wherein the metadata is semantically or contextually related to associated ones of the one or more documents.

42. The computing device of claim 37, wherein the metadata comprises at least one of article title(s), product problem context, or product problem resolution information, and wherein the calculating means to calculate relevance further comprise weighting means to weight the article title(s) or product problem context to indicate a greater relevance than any product problem resolution information.

43. The computing device of claim 37, wherein the calculating means to calculate relevance further comprise assigning means to assign greater relevance to feature(s) of the metadata that occur in content of the data source with greater frequency as compared to the frequency of occurrence of other metadata features in the content.

44. The computing device of claim 37, wherein the calculating means to calculate relevance further comprise assigning means to assign greater weight to feature(s) of the metadata found in a document of the one or more documents as a function of an age of the document.

45. The computing device of claim 37, wherein the one or more sources of data comprise a search query log, and wherein the calculating means to calculate relevance further comprise:

identifying means to identify search queries from the search query log, wherein the search queries have a relatively high frequency of occurrence (FOO) to search the data source;

determining means to determine article(s) selected by an end-user from search query results, the article(s) being from the data source; and calculating means to calculate missing end-user selection(s), where a missing end-user selection is an article in the search query results that was not selected.

* * * * *